United States Patent
Rehm

(10) Patent No.: US 11,615,409 B1
(45) Date of Patent: Mar. 28, 2023

(54) BATTERY MANAGEMENT REWARD NETWORK AND SYSTEM

(71) Applicant: William C. Rehm, Boulder, CO (US)

(72) Inventor: William C. Rehm, Boulder, CO (US)

(73) Assignee: Deedstack, Inc., Boulder, CO (US)

( * ) Notice: Subject to any disclaimer, the term of this patent is extended or adjusted under 35 U.S.C. 154(b) by 0 days.

(21) Appl. No.: 17/820,532

(22) Filed: Aug. 17, 2022

Related U.S. Application Data

(60) Provisional application No. 63/293,017, filed on Dec. 22, 2021.

(51) Int. Cl.
| | |
|---|---|
| *G06Q 20/38* | (2012.01) |
| *G06Q 20/10* | (2012.01) |
| *G06Q 20/36* | (2012.01) |
| *G06Q 50/06* | (2012.01) |
| *H04L 9/32* | (2006.01) |
| *H04L 9/00* | (2022.01) |

(52) U.S. Cl.
CPC ......... *G06Q 20/3825* (2013.01); *G06Q 20/10* (2013.01); *G06Q 20/36* (2013.01); *G06Q 50/06* (2013.01); *H04L 9/3213* (2013.01); *H04L 9/50* (2022.05); *G06Q 2220/00* (2013.01)

(58) Field of Classification Search
CPC .... G06Q 20/3825; G06Q 20/10; G06Q 20/36; G06Q 50/06; G06Q 2220/00; H04L 9/50; H04L 9/3213
USPC .......................................................... 705/71
See application file for complete search history.

(56) References Cited

U.S. PATENT DOCUMENTS

| | | | | |
|---|---|---|---|---|
| 11,444,338 | B1 * | 9/2022 | Dhawan | H01M 10/48 |
| 2018/0198360 | A1 * | 7/2018 | Featherly | H02K 53/00 |
| 2019/0392489 | A1 * | 12/2019 | Tietzen | G06Q 20/065 |
| 2021/0012605 | A1 * | 1/2021 | Yamine | G07F 7/06 |
| 2022/0084015 | A1 * | 3/2022 | Fawzy | H04L 51/52 |

(Continued)

OTHER PUBLICATIONS

Pradhan et al. ("A blockchain based lightweight peer-to-peer energy trading framework for secured high throughput micro-transactions", www.nature.com/scientificreports, Aug. 24, 2022, 15 pages) (Year: 2022).*

(Continued)

*Primary Examiner* — James D Nigh
(74) *Attorney, Agent, or Firm* — Thomas D. Anderson; Holland & Hart LLP

(57) ABSTRACT

Methods, systems, and devices are described. A battery management system may receive, in accordance with a smart contract in support of a blockchain, an indication of an agreement between a sponsor and a user of a rechargeable battery associated with a battery identifier. The agreement may indicate battery usage conditions and a token release amount for each of the battery usage conditions. The battery management system may receive battery usage information associated with the battery identifier of the rechargeable battery. The battery management system may determine that the battery usage information satisfies the battery usage conditions. The battery management system may cause execution of a token release action responsive to determining that the battery usage information satisfies the battery usage conditions. The token release action may cause transmission of the token release amount of tokens managed by the smart contract to participants set forth in the agreement.

20 Claims, 13 Drawing Sheets

(56) References Cited

U.S. PATENT DOCUMENTS

2022/0292621 A1\* 9/2022 Tian ................. G06Q 50/26
2022/0309476 A1\* 9/2022 Chen ................ G06Q 30/018

OTHER PUBLICATIONS

Hua et al. ("Apply blockchain technology to electric vehicle battery refueling", Proceedings of the 51st Hawaii International Conference on System Sciences, Sep. 19, 2017, pp. 4494-4502) (Year: 2017).\*

\* cited by examiner

BATTERY MANAGEMENT REWARD NETWORK AND SYSTEM

CROSS REFERENCES

The present Application for Patent claims priority to U.S. Provisional Application No. 63/293,017 by Rehm, entitled "Electric Vehicle (EV) and Battery Management Rewards System and Network," filed Dec. 22, 2021, which is assigned to the assignee hereof and expressly incorporated herein by reference in its entirety.

FIELD OF TECHNOLOGY

The present disclosure relates generally to collaborative energy management, and more specifically to a battery management reward network and system.

BACKGROUND

Users of rechargeable batteries and other renewable energy sources may have a positive impact on the environment. For example, using green (environmentally friendly) energy may help reduce greenhouse gas emissions and promote environmental sustainability. However, the actions or impacts of these users may be isolated, and may not benefit from the impact of inter-party collaborations, agreements, deeds, acts, pledges, partnerships, etc.

DETAILED DESCRIPTION

Figure 1:
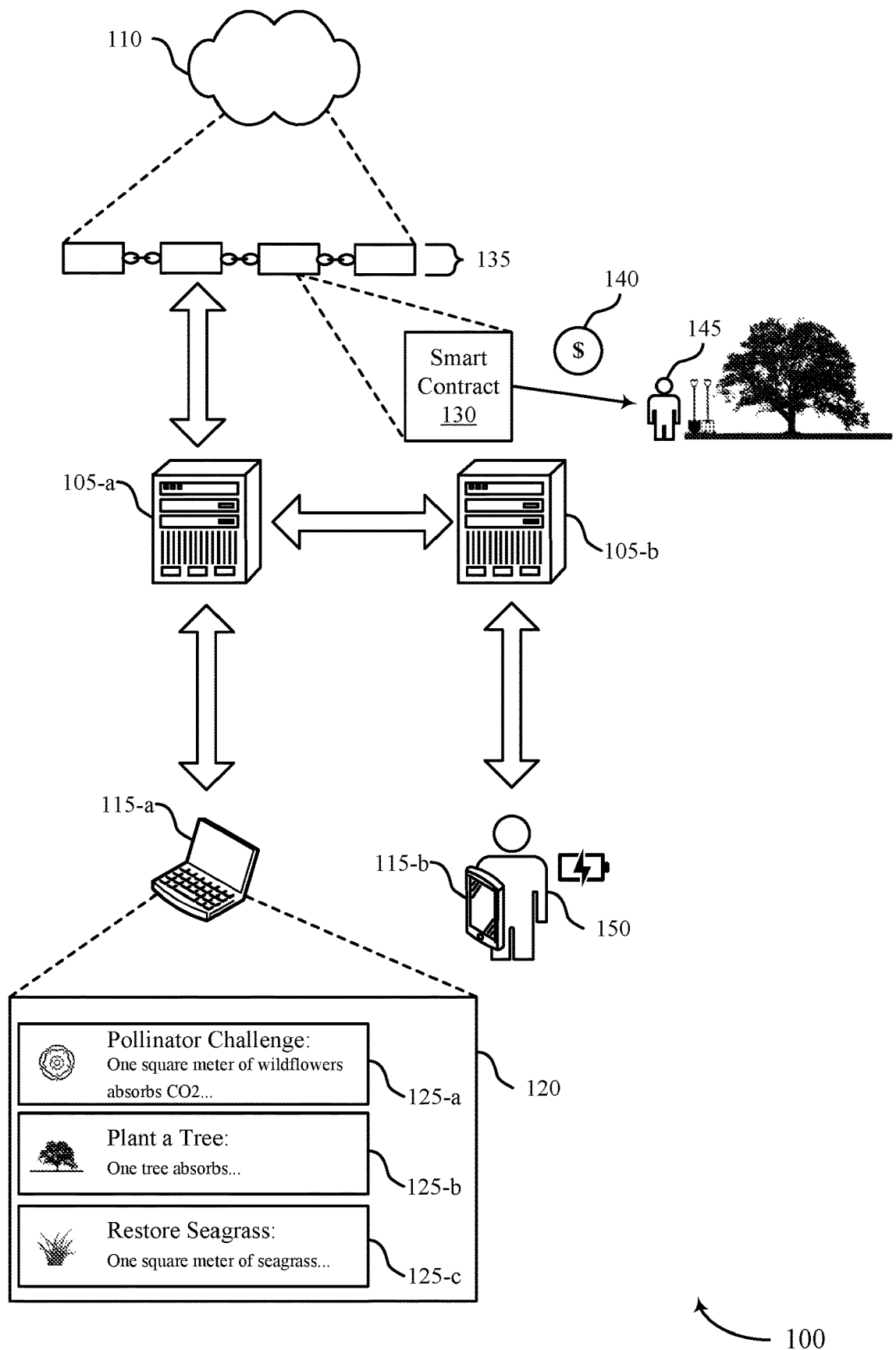
FIGS. 1 through 4 illustrate examples of energy management systems that support a battery management reward network and system in accordance with one or more aspects of the present disclosure.

Various users may store, distribute, share, and manage electricity, or energy that can be used, stored, or distributed in batteries and platforms (such as an electric vehicle (EV), an electric bike (eBike), or a solar system) that use batteries. This energy can be stored in devices, platforms, or systems that are possessed, owned, operated, leased, rented, or managed by users of EVs, eBikes, solar systems, consumer devices, products, services, or other platforms. Participants in the system may be owners or operators of platforms that use or store sustainable electric power or may otherwise be associated with platforms or batteries. Participants in the system may engage in environmentally friendly (green) actions or habits. Such actions and habits may result in environmental impacts. In some examples, the actions or impacts may be associated with platforms or batteries.

Aspects of the present disclosure support connecting multiple disconnected, distributed participants in a rewards system around environmental or green actions, habits, or pledges which are centered around the possession or use of platforms that use, store and share electricity. One or more smart contracts may be used to connect participants and may allow participants to formalize collaborations, agreements, deeds, acts, pledges, or partnerships, or a combination thereof. Smart contracts may be used in the system for the purpose of promoting, managing, and rewarding green or environmentally-friendly energy use, through inter-party collaborations, agreements, deeds, acts, pledges, partnerships, and so on. In some examples, the rewards system may reward diligent battery care and environmentally beneficial use of platforms and batteries.

In some examples, the rewards system may award token rewards that are issued to users or associated with platforms or batteries. Token rewards may be stored in liquidity pools, custodial wallets and vaults, multi-signature wallets and vaults, etc. These tokens may be managed by participants or by a community and/or a decentralized autonomous organization (DAO). In some examples, participants in the rewards system may be connected over communication pathways (e.g., using mobile computing and communication devices) or may engage in social signaling (e.g., by using green social signaling devices for homes, vehicles, fleets, businesses, infrastructure, charging stations, roadways). In other examples, the act of charging, storing, or sharing electricity may trigger awards. In some cases, the rewards system may utilize infrastructure on roadways, garages, or other networks and system infrastructure, or a combination thereof.

Aspects of the present disclosure may be implemented to realize one or more of the following advantages. The described techniques may promote longer battery life, greater battery efficiency, reduced greenhouse gas emissions, and more sustainable energy usage, among other benefits. For example, the techniques described herein may reward users and participants for environmentally friendly behaviors (charging batteries at designated locations, sharing energy with other users, purchasing environmentally conscious products) by transforming these behaviors and actions into tangible impacts (planting trees, protecting wildlife, restoring natural habitats) that reduce greenhouse gas emissions and promote sustainability.

Aspects of the present disclosure are initially described in the context of energy management systems, signaling diagrams, and process flows. Aspects of the disclosure are further illustrated by and described with reference to apparatus diagrams, system diagrams, and flowcharts that relate to a battery management reward network and system.

FIG. 1 illustrates an example of an energy management system 100 that supports a battery management reward network and system in accordance with one or more aspects of the present disclosure. The energy management system 100 includes servers 105, a computing cloud 110, and client devices 115. The energy management system 100 may support promising, funding, triggering, and tracking actions, projects, deeds, or events associated with use of rechargeable batteries, for use when such deeds, actions, or events use the participation of multiple parties who are to collaborate, or act in concert, or perform acts or actions in a sequential manner, in trustable, transparent ways. Such actions, deeds, or events may be related to persons, places or things in either physical or digital domains.

As illustrated in FIG. 1, a server 105-*a* may support the techniques described herein. For example, the server 105-*a* may support a project or agreement marketplace, smart contract provisioning, monitoring, and execution, platform data monitoring, and associated services. The server 105-*a* may represent various physical and logical computing systems. In one example, the server 105-*a* supports a website or application that is accessible by client device 115-*a*. The client device 115-*a* may be an example of a computing device that is accessible by a person (e.g., employee) associated with an organization or brand. According to techniques described herein, the organization, brand, entity, government, or the like may become a sponsor of a project.

As illustrated at user interface 120, a marketplace of projects 125 (e.g., agreements) is provided. Each project 125 may be associated with a quantifiable environmental impact, such as reduced carbon, carbon offset, clean water, etc. Further, each project 125 may be associated with an act performed by an impact provider. The acts may include planting a tree, mechanically or geologically capturing or sequestering carbon, grass restoration, wildflower planting, etc. Impact providers may be examples of organizations that may perform the acts. An organization may access the marketplace using the client device 115-*b* in order to select and purchase a project 125. A project 125 may be an initiative, which represents an offer or a promise by a sponsor to perform, or cause to be performed, an act, or action, or deed, or event, either physical or digital, in a specified manner, dependent upon a counterparty first performing an action to unlock the offer. Each project 125 may be associated with a duration.

The organization may select a project 125-*a*, an amount associated with the project 125-*a*, actions associated with activation of the project 125-*a*, etc. For example, if the organization selects the "plant a tree" project 125-*b*, then the organization may decide to support the planting of a thousand trees by selecting an amount at a user interface component of the marketplace. Further, the amount be associated with a multiple of the quantifiable environmental impact. Further, a funding amount associated with the selected and configured project may be displayed to the organization/employee. The funding amount may be provided at the marketplace (e.g., using a point of sale service) or may be provided to the smart contract, as described herein.

Upon selection and activation of a project 125-*c* by the organization, the server 105-*a* may deploy a smart contract 130 on a blockchain 135 or initiate a transaction or communication with a smart contract 130 on the blockchain 135. The blockchain 135 may be supported by set of computing systems represented by the computing cloud 110. The set of computing systems of the computing cloud 110 may be examples of mining or staking computers that function to execute smart contracts (e.g., smart contract 130) as well as verify transactions occurring between various wallets, or contracts between various parties. The blockchain 135 may function as a cryptographically provable ledger of these transactions, and the ledger may be fully or partially stored on various nodes (computers, miners) supporting the blockchain 135.

The smart contract 130 may be an example of a self-executing contract that encodes provisions of the agreement associated with the selected project 125. The provisions may include funding amount, funding release actions, etc. As described in further detail herein, the smart contract 130 may also encode token distribution to various parties to a project 125. In some cases, the smart contract 130 may not be executable until the funds are locked into (e.g., escrowed into) the smart contract 130. These funds may be provided by the sponsor after selection of the project 125 or may be provided by the system described herein. More particularly, if the sponsor provides funds at the point of sale (POS) of the marketplace, then the marketplace provider may provide the funds to the smart contract for the sponsor. In some examples, the smart contract 130 may represent a set of executable contracts that are associated with the selected project or a set of projects.

Additionally, the selected project may be associated with a set of actions that are to be performed in order to release the funds to the impact provider (e.g., impact provider 145). In some cases, the actions may be preconfigured in association with the project 125. In other cases, the sponsor may select the actions, in addition to the funding release mechanisms associated with the actions. In some cases, an action condition (e.g., a threshold) may be encoded in the smart contract. The sponsor of the project may use a user interface (UI) supported by the server 105-*a* in order to author or configure the smart contract 130 such that the smart contract 130 specifies that the actions that are to be taken by each party to fulfill the terms of the contract as well as other information that defines the parameters of the offer (number of participants, offer quantity, units of action, cost per unit of action, impact projections, attribution, badges and credentials).

Upon receipt of the funds (e.g., an amount of cryptocurrency or tokens supported by the blockchain or an amount of cryptocurrency or tokens defined in dollars or another currency) in a multi-signature wallet or vault, a monitoring service may be activated by the server 105-*a*. The monitoring service may be configured to monitor a data feed of an external system (e.g., server 105-*b*), such as a one or more data feeds of systems and services that support battery use, charging, and electricity sharing. The external system is represented by the server 105-*b*, which may correspond to various physical and logical computing systems that support a service, such as the electrical battery charging, electricity sharing, or other type of service. The data may be accessed via an endpoint provided by the service, such as an application programming interface (API).

The monitoring service may monitor the data feed to determine whether a triggering action is performed. For example, the monitoring service may monitor battery usage information associated with rechargeable batteries, such as battery recharge information, trip information associated with a battery, battery electricity sharing information. Upon satisfaction of one or more conditions by the battery usage information, the system may call the smart contract such that a funding release action is performed. The funding release action may be a transaction that transfers a funding amount (e.g., funds 140) to an impact provider 145 associated with the selected project 125. Because this transaction is executed by the smart contract 130 on the blockchain, it may be verifiable and publicly available.

As part of the smart contract 130 authoring process, the project or offer is provisioned with the resources that may be used to fulfill the promise. Such resources may be committed to the collection and storage mechanism. For instance, a project by a sponsor may promise battery users that it will "plant one tree for each environmentally friendly recharge of a rechargeable battery. In this "plant one tree" example, during the contract authoring process, the sponsor specifies the action to be taken (plant a tree), the number of actions to be taken (10,000 trees, for instance), and the allocated funds for each tree ($2.00 per tree). So, in the "one tree" example, $20,000 from the sponsor may be collected and stored in a multi-signature custodial wallet or vault. The dispersal of these funds may be governed by the smart contract. The storage of these funds can take the form of, but is not limited to, an escrow, or a hold on funds charged through a credit card, or via Automated Clearing House (ACH) Transfers, or via the transformation of funds into cryptocurrency, or by the transfer of points or tokens, or through collateralized financial instruments or obligations, etc. In some cases, the storage may take the form of physical assets, such as trees, land, airspace, property, equipment, etc.

As described herein, the users (e.g., user 150) may perform the actions designated in the smart contract 130 or the monitoring service of the server 105-a. The actions may include any number of things, including an eco-friendly recharge of a battery, sharing of electricity on the grid, eco-friendly trip routing, or the like. The actual form and manifestation of the triggering mechanism that signals acceptance of a sponsor's offer on the part of the user or battery can take many forms, and is not limited to the aforementioned examples. Regardless, the triggering action may be associated with, or contains, a unique persistent identifier, as described herein.

The monitoring service may log each instance of the triggering action battery recharge, eco-friendly trip, electricity sharing, as well as information associated with the users (e.g., user 150), such as the handle, username, identifier, as well as the unique persistent identifier. The monitoring service may also log information associated with the battery, such as a battery identifier. As described herein, once a threshold number of triggering actions occur, as designated by the sponsor, the funding amount (e.g., funds 140) may be released to the impact provider 145. The releases may be bundled into tranches or portions, so that transport or transaction costs are limited.

As described herein, the energy management system 100 (e.g., the server 105-a) may support a dashboard that provides access to data of various projects, various brands/organizations, actions, etc. For example, the dashboard may support identification of a summation of the quantifiable environmental impacts that an organization has supported through a set of projects offered on the marketplace. Because this data is pulled from the blockchain 135, the metrics supported by the data may be verifiable by any party. As such, the organizations, brands, or users may advertise environmental impacts on various platforms (e.g., social media platform), services, etc. In some examples, the dashboard may provide an API that supports querying the data for various parties in order to support display of environmental impact credential on external services.

Each participant may access a dashboard that tracks and reports the progress of each offer. As triggering actions occur, and as the distributed ledger is updated, and as resources are released from the smart contract 130, the dashboard may reflect the activity as reported under the unique persistent identifier. Dashboards can be customized to each user class, so that sponsors, users, and impact providers may each have customized view of activities. However, in some cases a single unified dashboard may be used, one that is shared by all users in a unified view. The use of dashboards may support user registration and login.

In some cases, the participants to the energy management system 100, including the impact providers (e.g., impact provider 145), the sponsors, and the users 150 may receive certificates, credentials, micro-credentials, or badges, awards, or micro certificates that reflect actions, deeds, outcomes, or impacts. Such credentials or badges, designed for use to share and display on social media platforms and digital communication platforms or via signaling mechanisms on a vehicle, device, roadway, etc. Such certificates and credentials and badges may feature embedded hyperlinks or other types of links that bring up data and information such as the impact of the deed or action, how it was triggered, who sponsored it, impact provider information, etc. Badges and credentials can be issued for individual actions, bundled actions, cumulative acts, sponsored acts, and so on. Dashboards may also contain lists and offers for upcoming deeds, early access offers, friendly competitions among users, leader boards, special content, news about platform users, solicitations to join groups, build community, and so on.

In some examples, these credentials may be in the form of token(s) that are distributed by the smart contract 130, another smart contract, the server 105-a, etc. For example, the tokens may be supported by the blockchain 135. In some examples, the tokens may be examples of non-fungible tokens (NFTs). The tokens may reflect the amount if impact (e.g., the amount of quantifiable impact) that that the user or party contributed via the projects 125 and the smart contract 130. In some cases, the tokens may be programmable (dynamic) such that new or modified metadata can be written to the tokens to reflect new information. Thus, tokens may be compostable, dynamic, and capable of receiving new metadata.

Thus, as described with respect to FIG. 1, various aspects are supported by the energy management system 100. For example, the system supports various projects 125, parties that include a sponsor, users, impact providers, adjacency service providers, a smart contract 130, a collection and storage mechanism, a unique persistent identifier, a dashboard, impact metrics, and APIs.

The sponsor may be the party that makes a pledge, a promise, or an offer to fulfill or complete the project 125, which is an act, action, deed, or event that may be offered to users. The users may be users associated with a rechargeable battery, and who review the sponsor's offer, and upon review and acceptance of the offer, activate the offer via a triggering action, and who are provided with a dashboard to track, and collect, and share, and validate, and manage the actions and deeds that they have unlocked, etc.

The impact providers may be the party who fulfill the project pledge, or the promise, by performing or making real the sponsor's promised act, action, deed or event, such that the terms of the promise and the smart contract are fulfilled. Impact providers may be part of a sponsor's organization, or outside of it, or they can be vendors, or partners, or affiliates, or volunteers, members of clubs, or organizations of all types. Adjacency service providers, which may include insurers that insure projects, arbitrage providers who provide funds and resources and liquidity services, financial service providers, auditors, certificate issuers, etc.

The smart contract 130 (or a set of smart contracts) may govern the project and the activities and responsibilities and actions of the parties, and which defines a goal, and defines the obligations of each party, and which may contain provisions about the sequence in which each party is to act, the time in which they are to act, penalties for inaction, bonuses for special actions, etc. The smart contract uses blockchain technology to govern the terms around an action or event and holds all participating parties accountable for meeting the terms, and uses distributed ledger technology (DLT) to maintain an immutable record of transactions and events performed as part of the smart contract. In this way, actions can be validated and verified, audited, or otherwise proven.

The collection and storage mechanism may serve to collect, then hold in abeyance, or save, or freeze, or collect, or escrow, and retain any resources that are used to fund, or act, or activate, or make real, the project and to perform the act or deed as promised. The collection and storage mechanism and the hold and save functionality it provides may be manifested in digital form, or physical form, through escrows, vaults, or transaction holds, etc. The collection and storage mechanism may be implemented by the smart contract 130, as described herein.

A unique persistent identifier may be a number, code, alphanumeric string, phrase, hashtag, badge, symbol, mark, or any device that is uniquely identifiable, and that is assigned to each smart contract and each project 125 or offer, and carries through each action and every component listed herein. The unique persistent identifier is recorded in the smart contract, then used and recorded in each sequential action, step, or component of the system. The unique persistent identifier identifies each project, and associated action, or deeds action or event, to identify it uniquely. A trigger may be a triggering action, performed by the user (or battery associated with the user), and stipulated in the smart contract, that acts as an acceptance of the offer from the sponsor, and which activates the offer, and activates, or releases, or unlocks resources from the collection and storage mechanism, which holds such resources in reserve as it awaits the trigger or triggering action by the user to unlock resources including but not limited to funds or tokens, etc. As described herein, the trigger may be a threshold (e.g., an engagement threshold) that causes the funding release action to be executed.

The dashboard may keep a record of or record actions by all participants, including a name or identity of a participant, the participant's eco-ambitions, demands, future purchasing plans, the projects that the participant has participated in, and the outcomes of these project(s). The outcomes may include impact information such as cumulative impact measurements across multiple projects. The dashboard may contain credentials or badges or micro-certificates that are awarded for successful completion of projects or accomplishments related to outcomes and impacts. Impact metrics may correspond to measurements of the outcomes or impacts or other measurements of the project, or acts, actions, deeds, or events for use with the dashboard, or for integration with other platforms or systems, via APIs, or for use with partners, licensees, etc. The APIs may integrate with other solutions, software, systems, methods, or platforms, and may extend the features, functionality, and data of the techniques described herein to associates, or partners, or third parties.

It should be appreciated by a person skilled in the art that one or more aspects of the disclosure may be implemented to additionally or alternatively solve other problems than those described above. Furthermore, aspects of the disclosure may provide technical improvements to "conventional" systems or processes as described herein. However, the description and appended drawings include example technical improvements resulting from implementing aspects of the disclosure, and thus do not represent all of the technical improvements provided within the scope of the claims.

Figure 2:
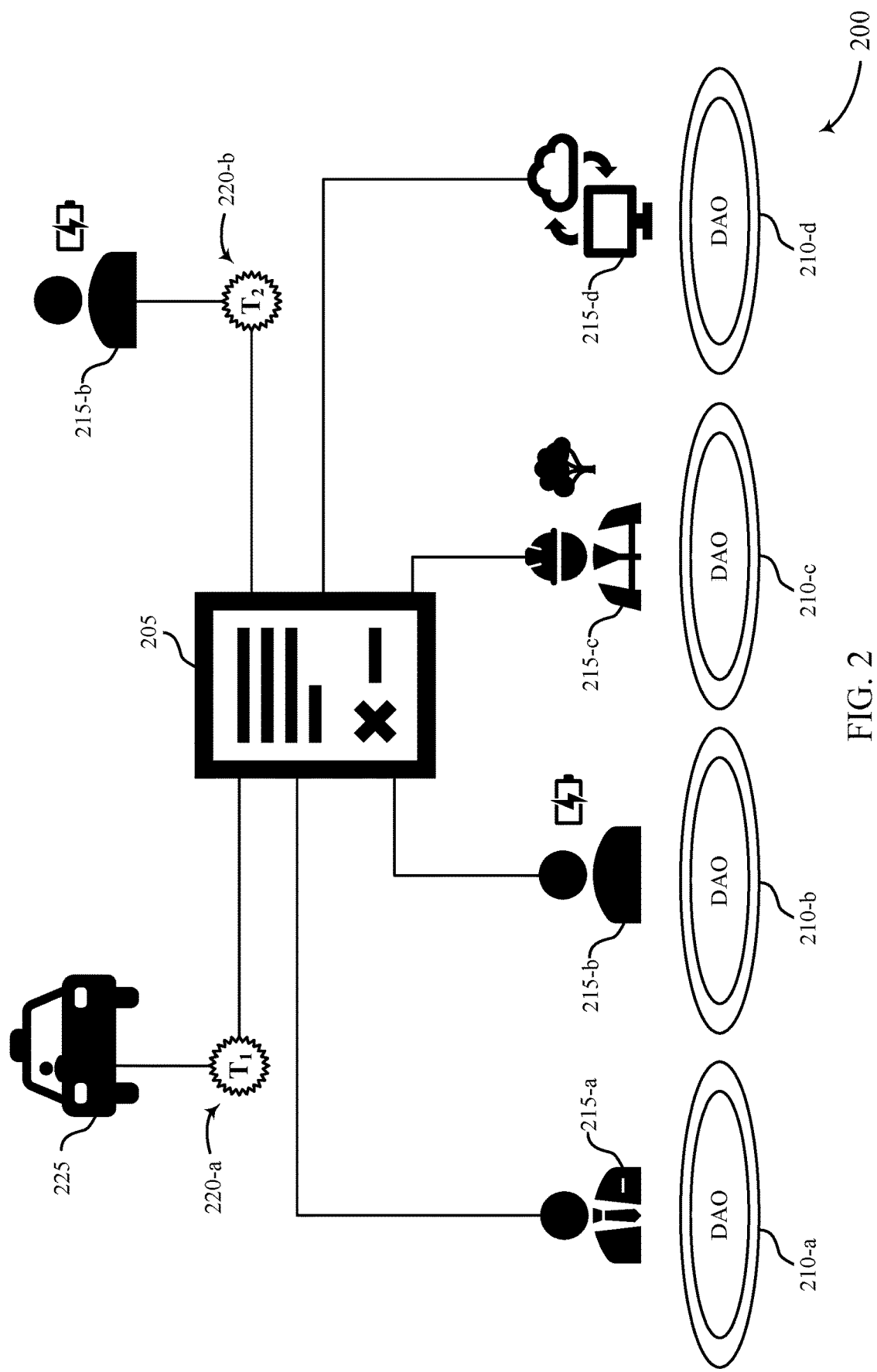

FIG. 2 illustrates an example of an energy management system 200 that supports a battery management reward network and system in accordance with one or more aspects of the present disclosure. The energy management system 200 may implement or be implemented by aspects of the energy management system 100. For example, the energy management system 200 may include a smart contract 205, which may be an example of the smart contract 130 described with reference to FIG. 1. The energy management system 200 may support collaboration between multiple distributed participants toward environmental actions. As described herein, the system diagram includes a smart contract 205 that may be provisioned and deployed by a system (e.g., a server 105-a of FIG. 1) to a blockchain (e.g., blockchain 135 of FIG. 1) supported by various computing systems. The smart contract 205 may define relationships or agreements between distributed participants in a rewards system. The rewards system may award tokens 220 to participants based on environmental actions or impacts, or both.

The energy management system 200 may connect multiple participants 215 via the smart contract 205 and DAOs 210. A participant 215-a may be a business, government, NGO, or other entity. For example, the participant 215-a may be an EV dealership or an electricity provider. Groups of participants 215-a may be organized into one or more DAOs 210-a. A participant 215-b may be a consumer or user that uses or stores electricity (e.g., an owner or operator). Groups of participants 215 may be organized into one or more DAOs 210-b. A participant 215-c may be an impact provider. For example, the participant 215-c may be a nonprofit organization that provides green, environmental services (e.g., planting trees, cleaning ocean plastics, mechanically or geologically capturing and storing carbon) yielding quantifiable or qualifiable environmental results, impacts, or outcomes. In other examples, the participant 215-c may be an individual, a group, an ad-hoc organization, a DAO, or other entity. Groups of participants 215-c may be organized into one or more DAOs 210-c. A participant 215-d may be a platform partner and integrator. For example, the participant 215-d may be an EV dealership, an electricity provider, or an infrastructure user. Groups of participants 215-d may be organized into one or more DAOs 210-d.

The energy management system 200 may be implemented to connect additional participants 215 not explicitly referenced in the present disclosure via the smart contract 205 and additional DAOs 210. DAOs 210 may include additional participants not referenced to participate in one or more DAO networks. In some examples, the participant 215-a may be the same as the participant 215-b. In such examples, the participant 215-a may own or operate an EV fleet, solar system, eBike, or other platform or battery that stores or uses electricity.

The rewards system may award tokens 220. Tokens 220 may enable increased or varied functionality in the energy management system 200. For example, tokens 220 may include member incentives for completing physical or digital contracted tasks that are specified by the smart contract. In other examples, tokens 220 may include assignment of attribution, assurances, or attestations for physical objects or yields from physical objects in the energy management system 200 (e.g., EV, rechargeable battery). In other examples, tokens 220 may include, upon reaching a threshold, admission to the DAO 210 that is associated with each class of a participant 215. Further, tokens 220 may include participation in the DAO 210 that is associated with each class of the participant 215 (e.g., obtaining voting rights, surfacing community initiatives, allocating resources, voting on governance).

The rewards system may award tokens 220 in multiple different forms. In some examples, the rewards system may award tokens 220-*a* that are associated with the one or more platforms (e.g., EVs, eBikes, home solar systems) or batteries. For example, the rewards system may award tokens 220-*a* for shedding actions that occur during sales and transfers of platforms, batteries, or EVs. DAOs 210 may manage tokens 220-*a* in the rewards system. In other examples, the rewards system may award tokens 220-*b* to participants 215-*b*. For example, the rewards system may award tokens 220-*b* to the participants 215-*b* based on impacts and accomplishments of the participants 215-*b* or actions taken by the participants 215-*b*. In some cases, tokens 220-*b* may be awarded to grant the participants 215-*b* increased or varied functionality in the energy management system 200 (e.g., admission to or participation in DAOs 210).

Contracted agreements in the system in accordance with the smart contract 205 may yield environmentally positive, or eco-friendly, or pro-social, impacts. Impacts may come from many sources, including from participants 215-*c*. Participants 215-*c* may plant trees, mechanically or geologically capture and store carbon, restore habitats, engage in regenerative agriculture, plant seagrass, clean ocean plastic, protect wildlife, clean rivers, or a combination thereof. The work and impact of participants 215-*c* may be triggered or activated based on the actions of participants 215-*b* in the system. The smart contract 205 may specify the impacts that are credited to each contracted action, or series of actions. Impacts may be fulfilled by participants 215-*c* before or after participants 215-*b* perform triggering actions or event. For instance, a pool of impacts may be contracted or purchased in advance of actions occurring. In such cases, as contracted actions by participants 215-*b* occur, impacts may be drawn from a pool. Additionally, or alternatively, impacts may be delivered in real time by participants 215-*c* that perform impacts sequentially as they are activated from performance of the contracts.

Tokens 220 in the system may capture and represent impacts, or anticipated impacts, or participant actions contracted in the rewards system. The tokens 220 may embody or represent actions and impacts of participants 215. The tokens 220 in the system may capture participant actions and impacts of the actions. For example, an agreement between a participant 215-*a* and a participant 215-*b* may specify a user action (e.g., not overcharging a battery) in return for a reward (e.g., planting a tree) that yields impact (e.g., 10 pounds of carbon, or $CO_2$, offsets). The platforms 225 (e.g., EVs, eBikes, solar systems) may be considered participants in the rewards system. The platforms 225 may participate in the system by acting as impact vectors, or focal points. For example, once in the system, the platforms 225 may embody green action and become networked, distributed green nodes in a large scale and connected system. Impacts may be associated with attributions, as part of rewards delivery.

In some examples, the participant 215-*a* may be an example of a business that uses a steady supply of well-maintained, used EV batteries for green power generation efforts. The business may contract with participants 215 (e.g., users) to perform actions that optimize the health of batteries. Such contracting efforts may increase the supply of well-maintained batteries the business uses. In other examples, participant 215-*a* may be an EV or a solar system manufacturer that is optimizing the time it takes for products to become climate neutral. A product may be considered climate neutral when it reaches a threshold at which the EV eliminates greenhouse gasses released during systems of manufacture, transport, provisioning, installations, etc. The rewards system may reduce the miles-to-climate-neutrality (MTCN) for products and services, including EVs, eBikes, solar systems, and other consumer products.

In other examples, the participant 215-*a* may be an example of an electricity utility, or utilities, that attempt to surge power into one or more electricity grids during times of peak demand. Through the rewards system, the participant 215-*a* may contract with battery, EV, eBike or solar power owners, operators, and DAOs to share energy into public or private grids or microgrids during times of peak demand. In other examples, the participant 215-*a* may be a company that uses a supply of green electricity to power a new product line, manufacture products, or deliver services. The company may contract with users in the rewards system, DAOs in the rewards system, or both, to provide the green electricity. The contract may specify that users sharing electricity from platforms and batteries use green (renewable) electricity to charge batteries. An oracle or a charging station may validate that the charging performed by the user is green.

In some cases, the participant 215-*b* may be an EV fleet operator (e.g., package delivery fleets, rideshare fleets, rental car fleets, government fleets, military fleets). The participant 215-*b* may make efforts to demonstrate the greenness of EV fleets. For example, the participant 215-*b* may participate in the rewards system and use signals to show that EV fleets are managed in ways that are environmentally-friendly. In some cases, the participant 215-*a* may be a government, private company, or community that promotes and builds charging infrastructure (e.g., to encourage the use of EVs). Through the rewards system, the participant 215-*a* may provide owner/operators (equivalently referred to as users or participants) or prospective EV purchasers with rewards and incentives for using the chargers deployed by the participant 215-*a*.

Additionally, or alternatively, the participant 215-*a* may be an example of a business that uses a smart contract 205 in the rewards system to define and incentivize actions from participants 215 that yield well-maintained batteries when associated platforms (e.g., vehicles, solar systems, eBikes) become obsolete, during battery upgrades of associated platforms, during salvage of associated platforms, or any combination thereof. In some examples, the participant 215-*b* may be an EV owner that contracts with a business to supply batteries owned or operated by the business with green or renewable electricity. The rewards system may use information from the platform and from the business to validate that green electricity has been used to charge the batteries. In some examples, a platform 225 associated with a user, a battery, or both may be resold to a new user. In such examples, the rewards system may provide a trusted accounting of the electricity used by the platform or battery, the management of the platform or battery over time, or both.

For example, as described herein, a participant 215-*b* (e.g., a user) may select or otherwise indicate willingness to participate (e.g., via a user interface) in a climate action agreement associated with a rechargeable battery. The user may select the agreement from multiple selectable agreements. The agreements may be provided or indicated by a sponsor (e.g., participant 215-*a*). In some examples, the agreement is selected based on the agreement being associated with a particular impact provider (e.g., a tree planting service) which the user has some interest. The agreement may indicate one or more types of actions associated with the rechargeable battery that may satisfy the conditions of the agreement. Example actions may include, but are not limited to, charging the battery using green electricity, charging the battery at a certain time, location, upon a depletion threshold, charging the battery above or below a threshold, traveling on eco/battery friendly routes (e.g., via the EV associated with the battery), and sharing electricity.

As the battery is used, the battery or associated computing system (e.g., charging station, EV, in-car infotainment system, user computer), may periodically or intermittently transmit battery usage information, such as electricity depletion information, battery recharge information, electricity sharing information, to the smart contract 205 (e.g., to computing systems associated with or supporting the smart contract 205). The information may be transmitted as a transaction. In some cases, the information is routed through, and verified by, an oracle system.

Upon receiving the information (e.g., via a transaction), the smart contract 205 is executed to determine whether the received information satisfies one or more conditions as set forth in the agreement. In some cases, the agreement is identified based on an identifier of the user, the identifier of the battery, or both, that is received with the battery usage information. If it is determined that the battery usage information satisfies one or more conditions set forth in the agreement, a token release action may be executed that releases tokens to one or more participants 215 to the system. Additionally, or alternatively, for compostable or dynamic tokens, metadata of the token may be updated or rewritten to reflect that the one or more conditions (set forth in the agreement) have been met. As an example, an amount of tokens may be released to an impact provider, such as the participant 215-c, which may fund the impact (e.g., planting a tree). Tokens may also be released to the user (e.g., the participant 215-b) of the battery, the sponsor of the agreement (e.g., participant 215-a), or other participants of the system. In some examples, as described herein, the sponsor may escrow or provide the tokens that are released according to the token release action. In some examples, as described herein, the tokens may be released to the DAOs associated with the participants.

Each participant and/or device (e.g., battery, EV) may be associated with a digital wallet address. The digital wallet addresses may be used to support communication of information (e.g., battery usage information) and/or tokens between the participants to the system as described herein. Further, the digital wallet address may be used to cryptographically verify the information and/or tokens for each participant or device. For example, the information associated with a battery/battery identifier (based on transactions logged associated with the battery) may be used to grade the battery. For example, if the information indicates that the battery was recharged in a eco-friendly manner (e.g., once the battery is depleted below a threshold and/or up to a battery recharge threshold) for a particular percentage of recharges, then the battery may be given a good grade. If, on the other hand, the battery is consistently depleted below or above a threshold, and/or is recharged during peak electricity usage, then the battery may be given a low grade. Other types of battery usage and grading conditions are contemplated within the scope of the present disclosure. Similar techniques may be used to grade a user of the system (e.g., based on whether information associated with the user indicates that the user performed eco-friendly actions).

Additionally, the information and transaction logs that support the techniques described herein may be used to reduce the Miles to Climate Neutrality (M2CN) of an EV. For example, the positive environmental impacts supported by the techniques described herein may be associated with an EV as contract/agreement thresholds are satisfied. More specifically, without the techniques described herein, it may take 30,000 miles for a platform (an EV) to work off 10 tons of $CO_2$ (or greenhouse gas equivalents emitted during the manufacture of the platform and its battery) to reach a point of carbon neutrality. After this point, the platform produces positive environmental benefits. In other words, it takes 30,000 miles for the platform to achieve M2CN.

Using the techniques described herein, the M2CN of a platform can be reduced (for example, from 30,000 miles to 20,000 miles). As an operator uses the platform to produce positive environmental impacts, the platform becomes a participant in the system, and can receive or be attributed with impact attributions that flow through actions of operators that use the platform. For example, an operator and sponsor may agree (via the smart contract 205) on usage conditions to improve the platform's positive environmental impacts (green charging, route optimization). As such, the platform becomes an impact vector, and as thresholds are met, the platform begins to offset the $CO_2$ and greenhouse gas equivalents used to make the platform.

Figure 3:
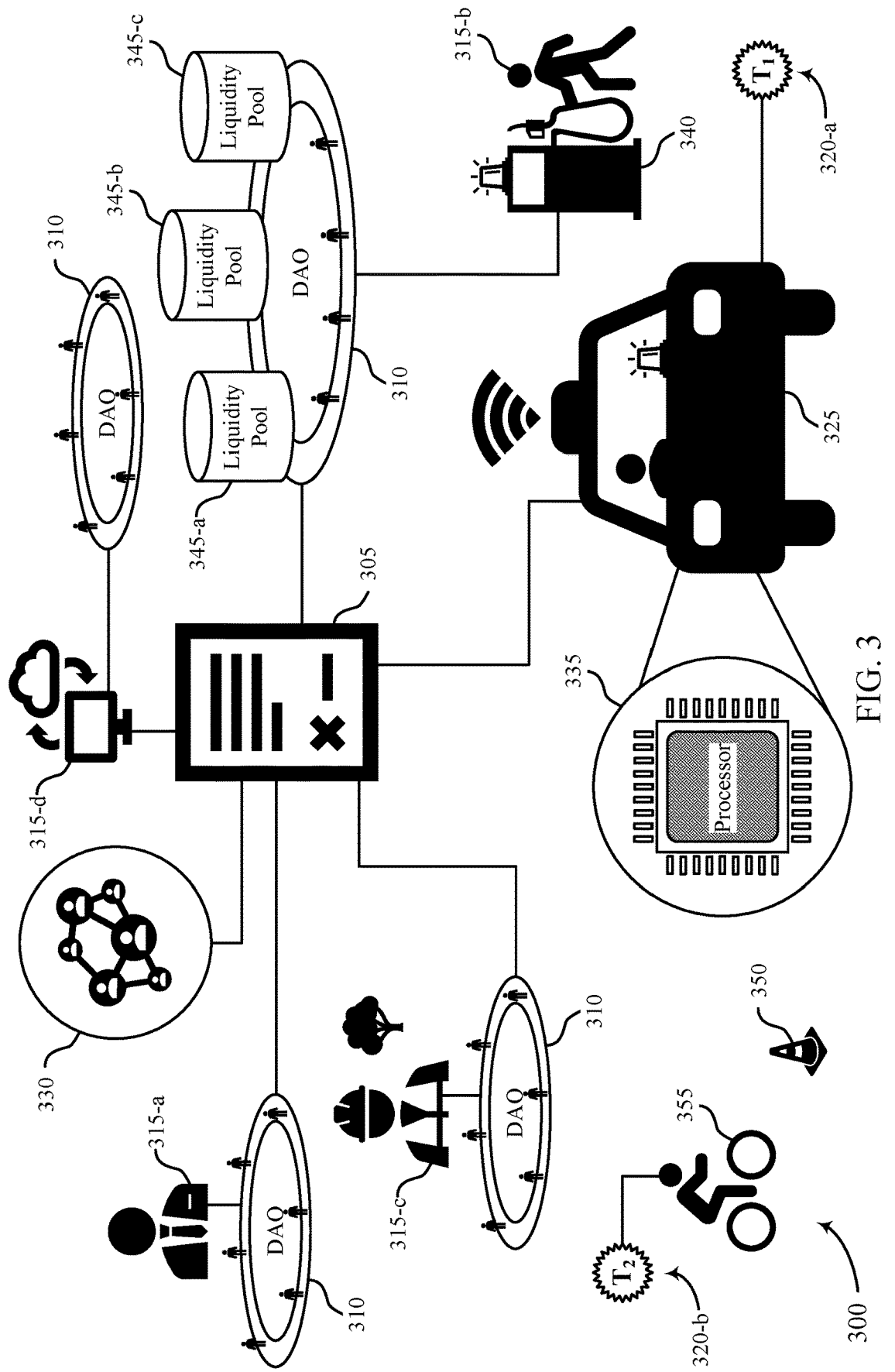

FIG. 3 illustrates an example of an energy management system 300 that supports a battery management reward network and system in accordance with one or more aspects of the present disclosure. The energy management system 300 may implement or be implemented by aspects of the energy management systems described with reference to FIGS. 1 and 2. For example, the energy management system 300 may include a smart contract 305, which may be an example of a smart contract 205 or a smart contract 130, as described with reference to FIGS. 1 and 2. The energy management system 300 may connect multiple participants 315 through the use, storage, distribution, and sharing of electricity.

As described herein, the smart contract 305 may connect participants 315 in a rewards system. The participants 315 may be associated with DAOs 310. Participants may utilize platforms that use and store electricity (e.g., batteries, EVs, eBikes, home solar systems). For example, participants may utilize an EV 325 or an eBike 355. The EV 325 may include a processor 335, and the EV 325 may be integrated with oracles, APIs, middleware, integration software, or a combination thereof. A reward system may award tokens 320-a (T1) that are embedded and associated with the EV 325, tokens 320-b (T2) that are issued to a participant 315-b, or both. The participants 315 may be examples of the participants 215 described with reference to FIG. 2. The DAOs 310 may be examples of DAOs 210 described with reference to FIG. 2.

The energy management system 300 may be implemented to connect multiple participants around the use, storage, and distribution, or sharing, of electricity, and rewards participants for managing electricity and energy storage platforms (batteries, EVs, eBikes, solar systems) in ways that promote environmentally-friendly, or green, purchases, action, deeds, impacts, pledges, or a combination thereof. The rewards system may connect multiple users (e.g., a participant 315-c) using the smart contract 305. The smart contract may specify and record the roles, responsibilities, and rewards, for each party or participant, and the contract data, or information, may be recorded on the blockchain 330 where the information may become distributed widely via a DLT. The smart contract 305 may specify the forms of green, or environmentally-friendly impact that is captured in, or associated with, or yielded from, successful performance of contracted actions, pledges, or deeds by participants (e.g., a participant 315-d) in the system.

Impacts may have different forms and types. Agreements may be provisioned for activation as part of new platform sales (EVs, eBikes, solar systems), for instance, by participants 315-a (e.g., dealerships, service providers, electricity providers), or as part of warranties, or as part of insurance policies, or during charging, at car washes, bridges, tunnels, tolls, and so on. Agreements may take many forms, including automated agreements activated by parking an EV in a particular spot, traveling along a particular route, purchasing a product or service in a predefined way, charging a rechargeable battery during a particular time or using renewable energy, or any combination thereof. Agreements may be part of multiverses, Internet of Things (IoT), games, downloads, etc. The rewards system may facilitate and reward multiple types of green, or environmentally friendly, purchases, pledges, deeds, and activities supporting climate action. Action types may vary, and are specified in the smart contract 305 that governs participant activities.

The participants 315 may trigger rewards in the smart contract 305 when they perform actions. Actions may be variable and may be defined in many ways. For example, actions may include becoming a participant in the rewards system, charging one or more batteries of a platform with green renewable energy, charging the one or more batteries in specific ways or at specific locations, performing battery-to-battery charging, or performing at least 12 consecutive green charges (or any number of sequential actions), or any combination thereof. Other actions may include performing actions within geofenced areas (or containment within them), charging at dealerships, exercising habits that contribute to battery longevity, performance, or circularity, charging the battery at specific times (e.g., off-peak), sharing some, or all, of the electricity stored in a battery owned or operated by a participant 315-b, sharing some, or all, of the electricity stored in batteries for use in a liquidity pool 345 (a communal DAO electricity pool), or sharing electricity with other participants 315 in the system, or any combination thereof.

Further, a participant 315-b may perform actions including riding in an EV that has an owner or operator in the system (e.g., rideshares, taxi services, EV buses, public or private EV travel), using trip routing that takes EVs on environmentally friendly routes (e.g., energy efficient routes or routes that produce low carbon levels), purchasing green, renewable, or circular products and services, purchasing products or services that have been identified in the rewards system as being green or environmentally friendly, purchasing products or services that have been identified outside of the rewards system as being green or environmentally friendly, or purchasing products or services from participants 315 in the system (e.g., businesses). Other actions that participants 315 may perform include communicating green action taken via the rewards system to others (e.g., by one or more signals on an EV, eBike, solar system, home, office, or clothes worn by a participant 315-b), creating user generated content or other content, or collaborating with others in the system, or a combination thereof.

In some examples, participants 315 may perform actions including preventing overcharging or undercharging of batteries, moving an electrically powered transport platform (e.g., EV, eBike) to a location where other similar transport platforms are located, grouping electrically powered transport platforms together, buying, selling, or leasing a platform (e.g., EV, eBike, solar system), providing energy back to the grid in V2G scenarios (e.g., load balancing), or electricity sharing via vehicle-to-grid (V2G), vehicle to vehicle (V2V), or vehicle to home (V2H), or a combination thereof. Actions may also include performing prosocial actions (e.g., donating electricity to charities), performing automated actions (e.g., sharing EV green energy to a charity), performing integrated actions (e.g., associated with a credit card or gateway), satisfying a threshold of green or environmentally friendly actions, or charging before a storm strikes to aid in personal and community disaster recover, or any combination thereof.

Batteries and platforms in the system (e.g., EVs, eBikes, solar systems) may report information about electrical power charging, storage, and sharing via an Oracle, API, interface, or middleware. The batteries and platforms may communicate the information and data from the processor 335 to the smart contract 305 to confirm, record, and communicate smart contract performance and compliance as well as to trigger events, rewards, attributions, communications, or offers. The communicated information may include a battery in the platform and the current state, past state, projected future state, temperature, and elevation of the battery, and other information pertaining to battery use, performance, etc. EVs may communicate information via Wi-Fi, satellite communication, auditory communication, Infrared, mobile cell networks, over-the-air (OTA) systems (e.g., from EV manufacturers, industry groups, standards organizations), or any combination thereof. Additionally, or alternatively, EVs may communicate using one or more interfaces.

In some examples, the communicated information may include information and data associated with charging the battery. For example, the information may relate to who is charging the battery, what the battery is being charged by, when the battery is being charged, where the battery is being charged, why the battery is being charged, or a combination thereof. Such information, applicable to the battery in a current state or in a previous state, may be used to determine the relative green-state of the battery and the platform associated with it. Such information may be used to update the smart contract 305. The smart contract 305 may specify electrical or power assets that are controlled by an owner or operator oracle or middleware to watch, monitor, and record contracted actions in the smart contract 305. In some examples, the communicated information may include information and data about sharing electricity or energy with others. For example, the smart contract 305 may contain provisions for systematic charging that improves battery health, longevity, resale value and circularity.

In some examples, the communicated information may include information reported by charging stations 340 via oracles, APIs and other integrations. For example, an agreement of the smart contract 305 may specify certain types of charging at specific places and times, etc. In such cases, data may be reported back to the smart contract 305 when an EV charges at a specific charging station 340, or group of stations, etc. Charging stations or charging infrastructure may include public, private, or at home stations or infrastructure, stations or infrastructure along roadways, stations or infrastructure at car parks, garages, or other places where charging functions may be found, or any combination thereof.

In still other examples, the communicated information may include sharing electrical power into power grids (private, public, or government), micro-grids (private, public, or government) or to DAO participants in the system, or to friends and family, or to geofenced locations, or during specific time periods, or a combination thereof. Batteries, platforms, and systems that have stored renewable or green energy may have contractually-proven, accountable, measurable green electricity to share into grids, thereby helping to green (decarbonize) the grids. Additionally, or alternatively, the communicated information may include data and information from batteries of all kinds (lithium, solid state), data and information from leased or owned solar and electricity storage systems, data from satellites, remote sensing devices, IoT devices, geofenced zones, platform sensors in EVs, accelerometers located in homes, businesses, or government installations, or data from IoT products and services, car and truck fleets, public and private fleets, or roadway infrastructure 350 (public or private), or data communicated from charging stations.

As system participants achieve thresholds or goals set forth in the smart contract 305, the contract may issue rewards and attributions to participants that reflect environmentally-friendly or green actions. The rewards system may capture the rewards in tokens 320, which may represent multiple aspects of participants actions. In some examples, tokens 320 may represent satisfaction of reward conditions (e.g., charging batteries at off-peak times). In some cases, tokens 320 may include or indicate data showing that the conditions for a reward have been met (e.g., a sequence of 5 consecutive charging sessions using green renewable power). In other examples, the tokens 320 may include or indicate an estimate of the positive impact that the contracted actions have on the environment. Additionally, or alternatively, the tokens 320 may include or indicate attribution or credit for actions conducted under the umbrella of the smart contract 305. For example, tokens 320 may grant participants 215-b access to special driving lanes, parking spots, or roadway infrastructure 350. Tokens may be issued in incremental amounts, so that, for instance, specific actions have fractionalized token rewards. Some actions in the contract, once achieved, may yield rewards of 1 token. Other actions may yield 0.00325 tokens or 1.625 tokens or some other fractional quantity.

Since green, or environmentally friendly, actions are managed by the smart contract 305, and since tokens 320 issued in the rewards system reflect the impact of the actions, the tokens issued on the platform may become a meaningful and trusted representation or store of actions, accompanied by information or data that may validate or prove that the green actions taken to earn the token reward are real and had real impacts (e.g., the actions in the contract planted trees, saved wildlife). Examples of diligent use may include charging batteries with renewable power, sharing energy via V2G arrangements, charging before storms for disaster recovery, sharing energy to support disaster recovery, charging off peak, or a combination thereof.

Tokens 320 may be gathered into liquidity pools 345. Liquidity pools 345 may be managed by a DAO 310. For example, tokens 320-a may be collected into a liquidity pool 345-a or tokens 320-b may be collected into a liquidity pool 345-b. In another example, a liquidity pool 345-c may hold contracted electricity from participants 315 that is promised for delivery, or held in reserve, by the battery of a platform. In the case of an EV, the EV owner or operator may contract to allocate a percentage of stored energy to the liquidity pool 345-c, for the contracted use by managers of the system, participants in the system, or others, or a combination thereof.

Figure 4:
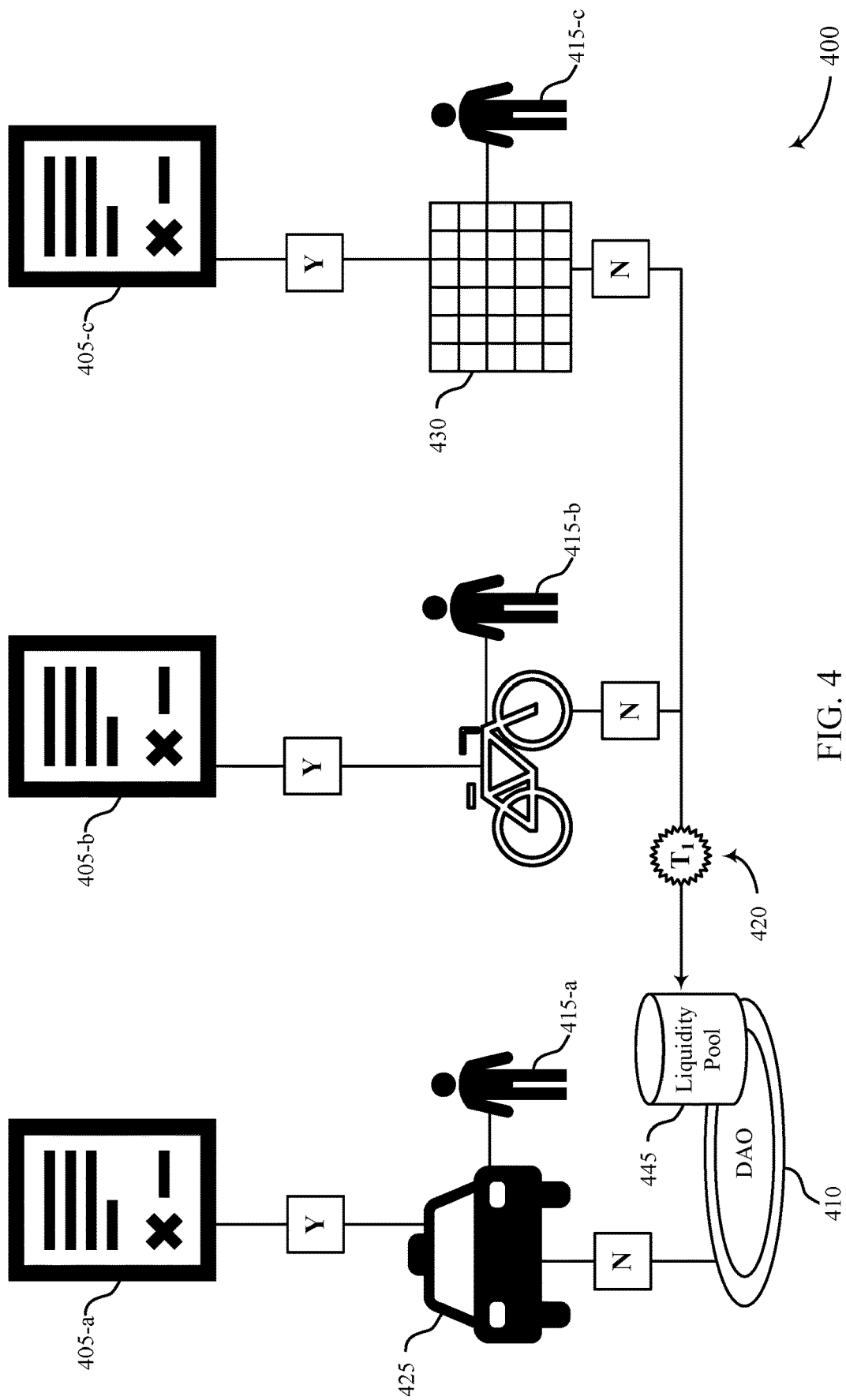

FIG. 4 illustrates an example of an energy management system 400 that supports a battery management reward network and system in accordance with one or more aspects of the present disclosure. The energy management system 400 may implement or be implemented by aspects of any of the energy management systems described with reference to FIGS. 1 through 3. For example, the energy management system 400 may include smart contracts 405 and users 415, which may be examples of corresponding contracts and users described with reference to FIGS. 1 through 3. The energy management system 400 may support multiple participants engaged in multiple smart contracts and the process by which a participant exchanges a platform or battery with a new user.

In the example of FIG. 4, a user 415-a may own or operate a platform 425 associated with smart contract 405-a. A user 415-b may own or operate an eBike associated with a smart contract 405-b. A user 415-c may own or operate a solar system 430 associated with a smart contract 405-c. After a transfer of ownership, the user 415-a of the platform 425 may agree to a smart contract 405-a (indicated by a Y in the example of FIG. 4). Alternatively, the user 415-a may opt-out or otherwise refrain from agreeing to the terms of the smart contract 405-a (indicated by an N in the example of FIG. 4). Likewise, a user 415-b of an eBike may agree to a smart contract 405-b. Alternatively, the user 415-b may reject or opt-out of the smart contract 405-b. Similarly, a user 415-c of a solar system 430 may agree to (or opt-out of) a smart contract 405-c.

The energy management system 400 may be implemented to associate a platform 425 (e.g., EV, eBike, solar system) and associated batteries with owners or operators via smart contracts 405 that capture and communicate information about the platform's electricity use, storage, sharing, etc. The smart contract 405 (or agreement within the smart contract) may specify how the user will manage the use, store, and sharing of electricity on the one or more platforms, to optimize green energy use, battery circularity, prosocial electricity sharing, or a combination thereof. Reward tokens 420 may represent the platform's contribution to the actions recorded in the contract.

Over time, the platform and the associated batteries may change ownership or operators. When the change of ownership or operator occurs, a clause in the operating agreement or smart contract 405 may be triggered, allowing for tokens 420 associated with the platform to be transferred to new users who become part of the system. If the transfer does not occur in a specified time period, the T1 tokens may be moved to the liquidity pool 445. Tokens 420 that return to the liquidity pool 445 are managed by the DAO 410, for allocation, burning, redistribution, etc. In some cases, the solar system 430 and the platform 425 may become separated. For example, the solar system 430 may be operational after the platform 425 experiences a failure. In such scenarios, the tokens 420 may stay with the solar system 430 as long as the new user remains in the rewards system or becomes a participant in the rewards system (indicated by a Y in the example of FIG. 4). In some examples, the new user may not become a participant in the rewards system (indicated by an N in the example of FIG. 4). In such examples, the tokens 420 associated with the solar system 430 may be allocated to the liquidity pool 445 over time.

Multiple networks may be part of the rewards system and may connect distributed participants in the rewards system. For example, the networks may facilitate external or partner networking, or otherwise provide for participants to communicate and interact with others through various means.

The networks may include communities or networks of users 415 that promote green electricity use, climate action, green consumption, eco-friendly actions, or a combination thereof. Further, the networks may include DAOs in the rewards system or outside of the rewards system. When in the rewards system, each group of users 415 may be provisioned with a DAO 410, to form participant, or user, communities. In some examples, the networks may include liquidity pools 445. The liquidity pools 445 may be part of DAOs 410 in the rewards system. Additionally, or alternatively, the liquidity pools 445 may be instituted outside of DAOs.

In some examples, the liquidity pools 445 may include social signaling networks that communicate or show participation in the system or voting and community management networks, enabled by, or as part of, or separate from DAOs. In some cases, the liquidity pools 445 may include virtual, or digital, characters that represent conceptual members in the network, and with external networks (games). For example, a system character in an external game may be Mother Nature, Mother Earth, Dirty Dan, Amazing Amethyst, Festival Folks, Coal-Rolling Rex, etc. The system characters may act as virtual networking participants to personify ideas, communicate information, present data, promote initiatives, promote climate action, or a combination thereof. In still other examples, the liquidity pools 445 may include physical and digital infrastructure. For example, when an EV owner operates or passes near a gate, a switch may operate, or the rewards system may grant the EV owner one or more permissions. Additionally, or alternatively, the liquidity pools 445 may include inter-network networking. In such examples, social media networks may communicate accomplishments, achievements, information, and rewards awarded by the rewards system to participants and partners on social media networks.

The rewards system may award the tokens 420 to users 415, platforms 425, or both. The tokens 420 may include impact attributions that identify a user 415 that performed an action, when the action was performed, and how the action was performed. Attribution data may be associated with the smart contract 405. The data may capture, quantify, or qualify actions and impacts in the form of tokens 420. The attributions may power many things inside the system and outside of it, such as DAO participation, leveling-up in the rewards system, games and activities, early access to new features, or a combination thereof. In some examples, the tokens 420 may include discounts for services related to users 415 and platforms 425 in the rewards system (e.g., charging discounts, tire discounts, discounts at tolls for roadways, bridges, tunnels, rail transport, discounts at stores).

In some cases, the tokens 420 may include early access to over-the-air (OTA) EV updates, entertainment, in-car commerce, new action and impact offers, new system features, or a combination thereof. Other examples of the tokens 420 may include blockchain games, downloads, discounts, special offers, special in-car entertainment bonuses, token air drops, special rewards (e.g., a user reaches green milestones, participates in special programs), or a combination thereof. In still other cases, the tokens 420 may support variable impact attribution. For example, the rewards system may enable variable attribution to be applied to an impact achieved in the system, so that multiple participants may get credit for a share of green or environmentally-friendly purchases, pledges, actions, deeds, etc. In such examples, the shared attribution may be defined in the smart contract, or via other means, resulting in varied attribution that can be represented as fractionalized attribution (e.g., user 415-*a*: 10.03%, user 415-*b*: 60%, user 415-*c*: 29.7%). Additionally, or alternatively, the tokens 420 may include or support social signaling.

Figure 5:
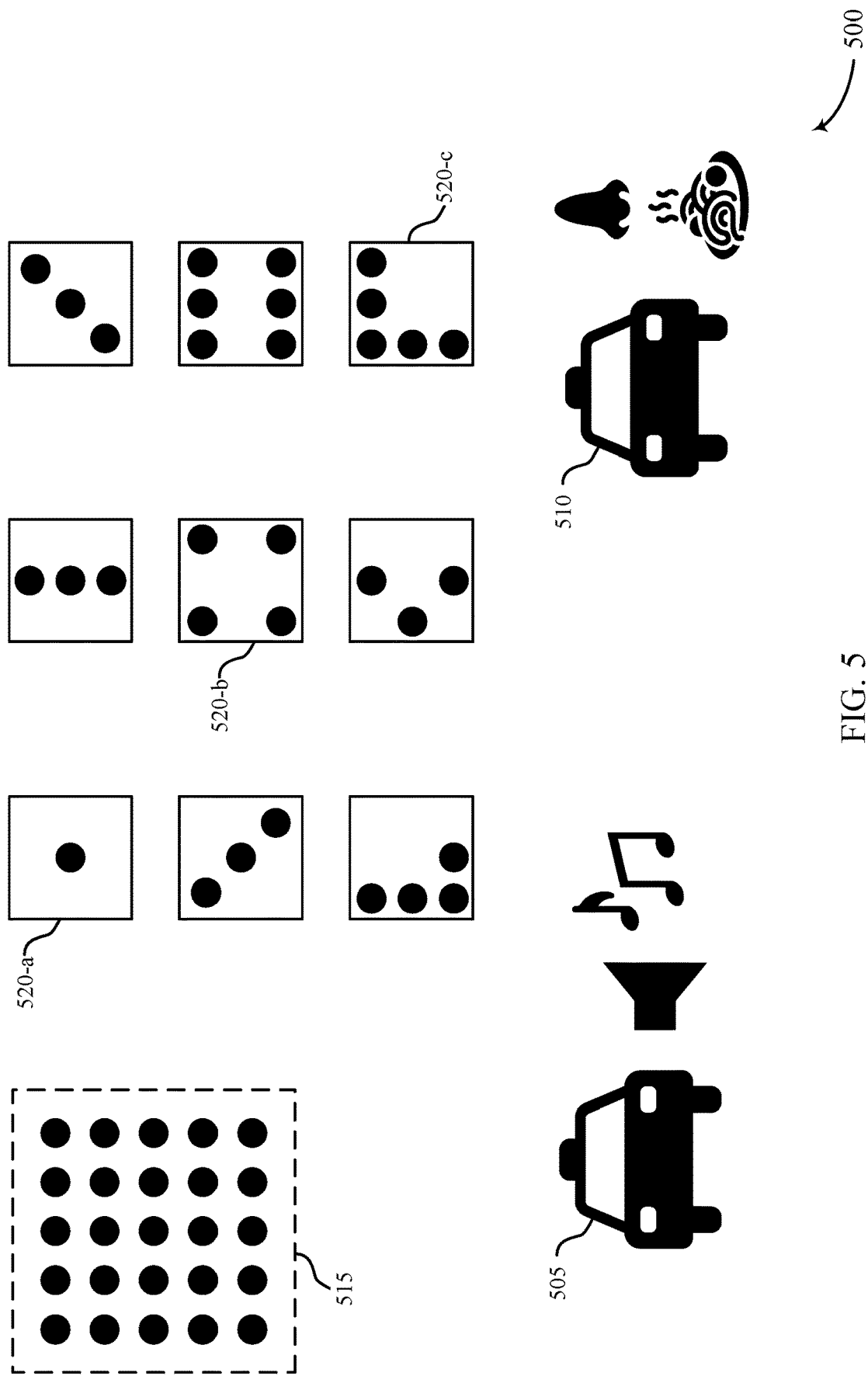
FIG. 5 illustrates an example of a signaling diagram that supports a battery management reward network and system in accordance with one or more aspects of the present disclosure.

FIG. 5 illustrates an example of a signaling diagram 500 that supports a battery management reward network and system in accordance with one or more aspects of the present disclosure. The signaling diagram 500 may implement or be implemented by aspects of any of the energy management systems described with reference to FIGS. 1 through 4. The signaling diagram 500 may support social signaling in a rewards system. A platform in the rewards system may perform social signaling using beacon signals. For example, a platform may use an auditory signal 505 or an olfactory signal 510. The platform may perform social signaling using complex mechanisms. For example, the platform may use an array 515. The platform may use the array 515 to perform sequenced signaling using different patterns.

The signaling diagram 500 may be implemented to show or communicate participation in the rewards system by participants (e.g., owners, operators, businesses, governments). In some examples, the rewards system may enable businesses, governments, and other participants in the rewards system to signal green or environmentally-friendly activities or accomplishments (e.g., an EV leasing company that enrolls all EVs in the system, a fleet management trucking company that takes part in the system, fleets of government vehicles). Signal types and the operation of signals may be manifold. For example, beacon signals (e.g., visual, tactical, olfactory, auditory) or indicators may be used.

Signals may be of any type, form, or location. Signals may have various associations. For example, signaling that represent purchases, pledges, deeds, activities, or impacts may be communicated in the rewards system by way of designs, lights, beacons, characters, flags, or any type of visual, auditory, or olfactory signal, or any combination thereof. Some examples may include signaling beacons or lights on moving EVs, signals that indicate green charging is occurring at charging stations, or signals that indicate a green EV owner or operator is a participant in the rewards system. Signals or beacons may be electronic or digital and may signal or inform infrastructure and IoT that a platform, battery, or user is nearby. In some examples, a signal may be a single light, signal, or indicator that communicates or conveys pro-social environmental action, pledges, purchases, deeds, or a combination thereof.

The rewards system may achieve complex signaling through arrays 515. In an example, the rewards system may use the array 515 for sequenced signaling (e.g., a sequence of patterns). The signaling may communicate complex information through the use of varied colors, configurations, intensities, frequencies, durations, or a combination thereof. In some examples, the rewards system may use auditory signals 505 (e.g., sounds) to signal participation in the rewards system. For example, the auditory signal may be a tune, sound pattern, or sequence of sounds, varied sound frequencies, or durations. In other examples, the rewards system may use olfactory signals 510 (e.g., smells) to signal participation. Additionally, or alternatively, the rewards system may use any signaling method that may be received by and sensed by an observer (e.g., vibrations) to signal participation.

Some signals 520 may activate rewards and functionality as participants engage in environmentally conscious actions. For example, a signal 520-*a* may activate one or more IoT infrastructure elements (parking spots, roadways) if a participant satisfies one or more conditions set forth in a smart contract (e.g., the smart contract 305 described with reference to FIG. 3). A signal 520-*b* may indicate a contribution level or achievement status of a participant (e.g., the participant 315-*b* described with reference to FIG. 3). A signal 520-*c* may activate or otherwise provide access to token-restricted content, in-vehicle experiences, downloads, etc. The signals 520 may also trigger or otherwise cause execution of other actions like social media posts, sounds, etc.

Aspects of the signaling diagram 500 may be implemented to realize one or more of the following advantages. The techniques described with reference to FIG. 5 may promote longer battery life, greater battery efficiency, reduced greenhouse gas emissions, and more sustainable energy usage, among other benefits. For example, the described techniques may reward users and participants for environmentally friendly behaviors (charging batteries at designated locations, sharing energy with other users, purchasing environmentally conscious products) by providing exclusive content (achievements, roadway access, in-vehicle entertainment, social media content) to participants via signals 520.

Figure 6:
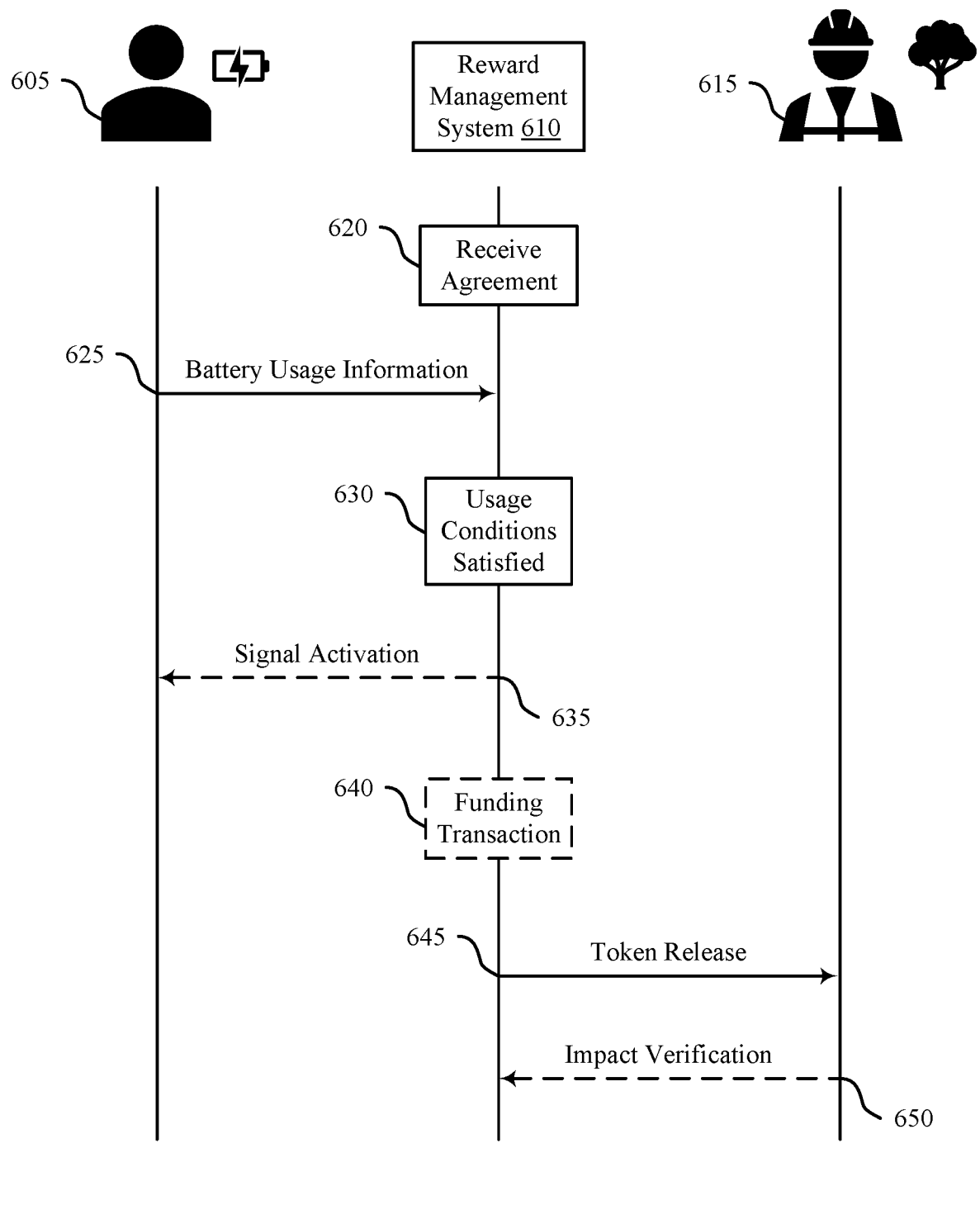
FIG. 6 illustrates an example of a process flow that supports a battery management reward network and system in accordance with one or more aspects of the present disclosure.

FIG. 6 illustrates an example of a process flow 600 that supports a battery management reward network and system in accordance with one or more aspects of the present disclosure. The process flow 600 may implement or be implemented by one or more aspects of the energy management systems described with reference to FIGS. 1 through 4. For example, the process flow 600 may include a user 605 and an impact provider 615, which may be examples of corresponding users described with reference to FIGS. 1 through 4. The process flow 600 may also include a reward management system 610, which may be implemented using a blockchain (e.g., the blockchain 330 described with reference to FIG. 3). In the following description of the process flow 600, operations between the user 605, the reward management system 610, and the impact provider 615 may be added, omitted, or performed in a different order (with respect to the exemplary order shown).

At 620, the reward management system 610 (or a battery management network supporting the reward management system 610) may receive an indication of an agreement between a sponsor (not shown) and the user 605. The indication may be received in accordance with a smart contract (e.g., the smart contract 305 described with reference to FIG. 3). The user 605 may have access to a rechargeable battery associated with a battery identifier. For example, the user 605 may be an example of an owner, lessor, operator, or renter of the rechargeable battery. In some examples, the battery identifier may correspond to an electric vehicle that includes the rechargeable battery. The agreement may indicate one or more battery usage conditions and a token release amount for each of the one or more battery usage conditions specified in the agreement. In some examples, the reward management system 610 may receive a selection of the agreement via a user interface associated with a market of climate action agreements. The agreement may be selected from one or more selectable agreements that are each associated with a respective sponsor and one or more battery usage conditions. In some cases, an agreement corresponds to a project or action, as described herein.

At 625, the reward management system 610 may receive battery usage information associated with the battery identifier of the rechargeable battery. The reward management system 610 may receive the battery usage information via an oracle system that is configured to verify the battery identifier of the rechargeable battery, an identity of the user 605, or various aspects of the battery usage information (recharge amount, recharge location, charge status, user activity) associated with the rechargeable battery. The battery usage information may include recharge and utilization information associated with the battery identifier of the rechargeable battery. For example, the battery usage information may indicate one or more of a battery recharge time, a battery recharge location, or a battery depletion amount associated with the battery identifier of the rechargeable battery. In some examples, the reward management system 610 may generate or otherwise determine one or more of a battery grade, a resale value, or a battery hygiene grade for the rechargeable battery (or the user 605) using a transaction log associated with the smart contract.

At 630, the reward management system 610 may determine that the battery usage information satisfies the one or more battery usage conditions responsive to execution of the smart contract. For example, the reward management system 610 may determine that recharge and utilization information (received at 625) satisfies a battery recharge condition (recharge amount, recharge window, recharge location, depletion amount) specified in the agreement. Additionally, or alternatively, the reward management system 610 may determine that a quantity of miles driven by the user 605 (in an electric vehicle that includes the rechargeable battery) satisfies a climate neutrality threshold based on the battery usage information. The smart contract may be executed using blockchain technology (e.g., a decentralized transactional ledger).

In some examples, the reward management system 610 may activate one or more signals at 635 in response to determining that the user 605 has satisfied the one or more battery usage conditions specified by the agreement. The one or more signals may include visual signals, auditory signals, or olfactory signals that indicate an environmental impact of the user 605, a contribution level of the user 605, an achievement status of the user 605, or a combination thereof. In some examples, the one or more signals (e.g., the signals 520 described with reference to FIG. 5) may activate one or more IoT infrastructure components, token-restricted memberships, exclusive downloads, in-vehicle experiences, social media interactions, or a combination thereof. In some examples, the reward management system 610 may receive a funding transaction from the sponsor at 640. The reward management system 610 may receive the funding transaction via automatic clearing house, credit card, check, cash, wire transfer, digital wallet, multi-signature custodial wallet, etc. One or more of the user 605, the impact provider 615, or the sponsor of the agreement may be associated with a DAO (e.g., the DAOs 310 described with reference to FIG. 3) that includes one or more consumers, sponsors, businesses, governments, or agencies.

At 645, the reward management system 610 may cause execution of a token release action responsive to determining that the user 605 has satisfied the one or more battery usage conditions set forth in the agreement. The token release action may cause transmission of the token release amount of tokens (e.g., the tokens 220 described with reference to FIG. 2) managed by the smart contract to the impact provider 615. The token release action may also cause transmission of a second amount of tokens (managed by the smart contract) to a digital wallet associated with the user 605 of the rechargeable battery. The digital wallet may be an example of a multi-signature custodial wallet, a DAO wallet, or a DAO vault that is governed or otherwise managed by DAO participants. In some examples, the digital wallet may be configured or otherwise managed through smart contracts.

Additionally, or alternatively, the token release action may cause transmission of at least a portion of a token (e.g., the token 320-*a* described with reference to FIG. 3) to an electric vehicle that includes the rechargeable battery. At 650, the reward management system 610 may receive a verification of an action taken by the impact provider 615. The reward management system 610 may receive the verification from a digital wallet associated with the impact provider 615 in response to execution of the token release action at 645. Impact verification may include, but is not limited to, a picture of the provided impact (e.g., an image of a planted tree), a transaction indicative of the impact (e.g., payments to providers or employees), etc.

Figure 7:
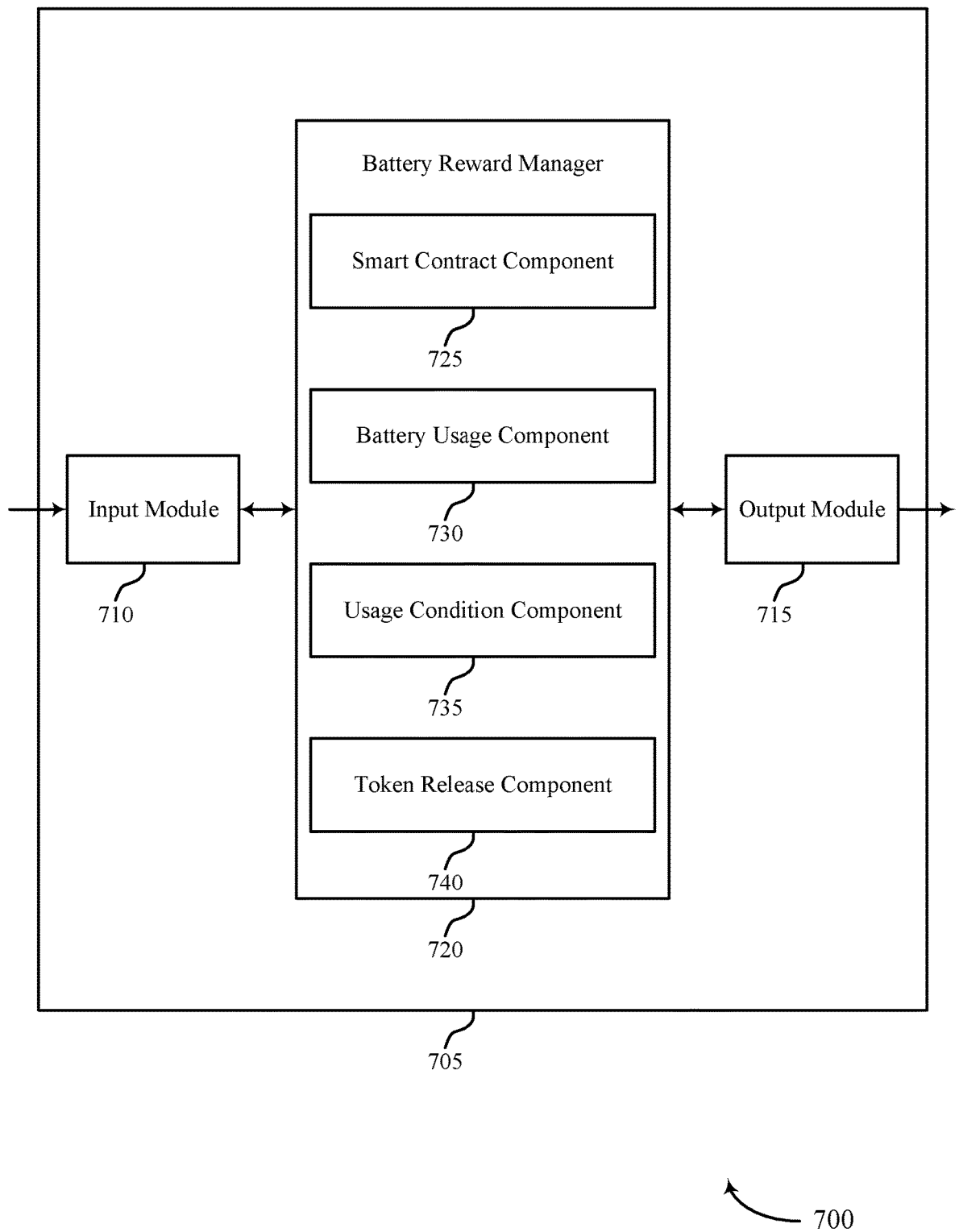
FIG. 7 shows a block diagram of an apparatus that supports a battery management reward network and system in accordance with one or more aspects of the present disclosure.

FIG. 7 shows a block diagram 700 of a device 705 that supports a battery management reward network and system in accordance with one or more aspects of the present disclosure. The device 705 may include an input module 710, an output module 715, and a battery reward manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the battery reward manager 720 to support a battery management reward network and system. In some cases, the input module 710 may be a component of an input/output (I/O) controller 910, as described with reference to FIG. 9.

The output module 715 may manage output signals for the device 705. For example, the output module 715 may receive signals from other components of the device 705, such as the battery reward manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910, as described with reference to FIG. 9.

For example, the battery reward manager 720 may include a smart contract component 725, a battery usage component 730, a usage condition component 735, a token release component 740, or any combination thereof. In some examples, the battery reward manager 720, or various components thereof, may be configured to perform various operations (e.g., receiving, monitoring, transmitting) using or otherwise in cooperation with the input module 710, the output module 715, or both. For example, the battery reward manager 720 may receive information from the input module 710, send information to the output module 715, or be integrated in combination with the input module 710, the output module 715, or both to receive information, transmit information, or perform various other operations as described herein.

The battery reward manager 720 may support battery management in accordance with examples disclosed herein. The smart contract component 725 may be configured as or otherwise support a means for receiving, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The battery usage component 730 may be configured as or otherwise support a means for receiving battery usage information associated with the battery identifier of the rechargeable battery. The usage condition component 735 may be configured as or otherwise support a means for determining, based on execution of the smart contract, that the battery usage information satisfies the one or more battery usage conditions indicated by the agreement. The token release component 740 may be configured as or otherwise support a means for causing execution of a token release action responsive to determining that the battery usage information satisfies the one or more battery usage conditions indicated by the agreement, where the token release action causes transmission of the token release amount of tokens managed by the smart contract to one or more participants set forth in the agreement.

Figure 8:
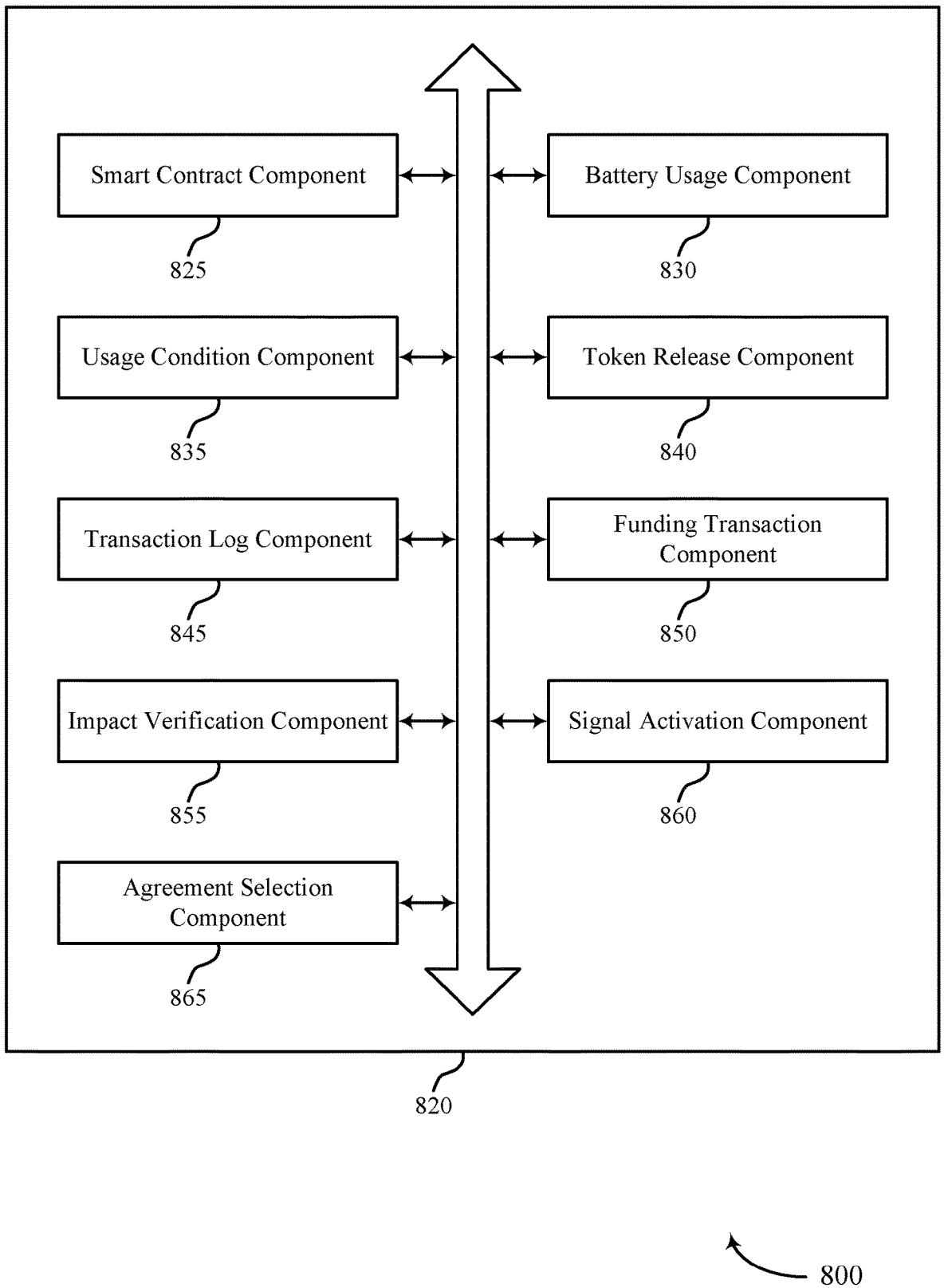
FIG. 8 shows a block diagram of a battery reward manager that supports a battery management reward network and system in accordance with one or more aspects of the present disclosure.

FIG. 8 shows a block diagram 800 of a battery reward manager 820 that supports a battery management reward network and system in accordance with one or more aspects of the present disclosure. The battery reward manager 820 may be an example of aspects of the battery reward manager 720 described with reference to FIG. 7. The battery reward manager 820, or various components thereof, may be an example of means for performing various aspects of a battery management reward network and system, as described herein. For example, the battery reward manager 820 may include a smart contract component 825, a battery usage component 830, a usage condition component 835, a token release component 840, a transaction log component 845, a funding transaction component 850, an impact verification component 855, a signal activation component 860, an agreement selection component 865, or any combination thereof. Each of these components may communicate, directly or indirectly, with one another (e.g., via one or more buses).

The battery reward manager 820 may support battery management in accordance with examples disclosed herein. The smart contract component 825 may be configured as or otherwise support a means for receiving, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The battery usage component 830 may be configured as or otherwise support a means for receiving battery usage information associated with the battery identifier of the rechargeable battery. The usage condition component 835 may be configured as or otherwise support a means for determining, based on execution of the smart contract, that the battery usage information satisfies the one or more battery usage conditions indicated by the agreement. The token release component 840 may be configured as or otherwise support a means for causing execution of a token release action responsive to determining that the battery usage information satisfies the one or more battery usage conditions indicated by the agreement, where the token release action causes transmission of the token release amount of tokens managed by the smart contract to one or more participants set forth in the agreement.

In some examples, to support receiving the battery usage information, the battery usage component 830 may be configured as or otherwise support a means for receiving recharge and utilization information associated with the battery identifier of the rechargeable battery, where the recharge and utilization information satisfies a battery recharge condition of the one or more battery usage conditions.

In some examples, the battery recharge condition includes a recharge amount, a recharge time period, a recharge location, a battery depletion threshold, or a combination thereof. In some examples, the recharge and utilization information indicates a battery recharge time, a battery recharge location, a battery depletion amount, or a combination thereof.

In some examples, to support determining that the user has satisfied the one or more battery usage conditions, the usage condition component 835 may be configured as or otherwise support a means for determining that a quantity of miles driven by the user in an electric vehicle satisfies a climate neutrality threshold based on the battery usage information, where the electric vehicle includes the rechargeable battery associated with the battery identifier.

In some examples, the transaction log component 845 may be configured as or otherwise support a means for generating, using a transaction log associated with the smart contract and the battery identifier, a battery grade of the rechargeable battery, a resale value of the rechargeable battery, a maintenance status of the rechargeable battery, a battery hygiene grade of the rechargeable battery, a battery hygiene grade of the user, or a combination thereof.

In some examples, to support receiving the battery usage information, the battery usage component 830 may be configured as or otherwise support a means for receiving the battery usage information from an oracle system that is configured to verify the battery identifier of the rechargeable battery, information associated with the user of the rechargeable battery, a recharge amount, a recharge location, a battery charge status, battery usage activity, or a combination thereof.

In some examples, the funding transaction component 850 may be configured as or otherwise support a means for receiving a funding transaction that funds at least the token release amount of tokens, where the funding transaction is received via a digital wallet associated with the sponsor, an automated clearing house, a credit card, a check, cash, a wire transfer, or a combination thereof. In some examples, the battery identifier is associated with an electric vehicle that includes the rechargeable battery. In some examples, the battery usage information is received from the electric vehicle, a recharging station, or both.

In some examples, the impact verification component 855 may be configured as or otherwise support a means for receiving, from a digital wallet associated with the impact provider and in response to execution of the token release action, verification of an impact provided by the impact provider. In some examples, the token release action causes transmission of a second amount of tokens managed by the smart contract to a digital wallet associated with the user of the rechargeable battery.

In some examples, the token release action causes transmission of at least a portion of a token associated with one or both of the rechargeable battery or an electric vehicle that includes the rechargeable battery. In some examples, the user, the sponsor, the impact provider, or a combination thereof are associated with one or more DAOs that include one or more consumers, sponsors, businesses, governments, or agencies.

In some examples, the one or more battery usage conditions includes environmental trip routing conditions, electricity usage conditions, electricity sharing conditions, disaster recovery conditions, V2G sharing conditions, V2V sharing conditions, grid-load-balancing conditions, geofence usage conditions, or a combination thereof.

In some examples, the signal activation component 860 may be configured as or otherwise support a means for activating one or more signals responsive to determining that the user has satisfied the one or more battery usage conditions indicated by the smart contract. In some examples, the one or more signals include visual signals, auditory signals, or olfactory signals that indicate an environmental impact of the user, a contribution level of the user, or both.

In some examples, the one or more signals activate one or more IoT infrastructure components, token-restricted memberships, downloads, in-car entertainment experiences, social media interactions, or a combination thereof. In some examples, receiving, via a user interface of a market of climate action agreements, a selection of the agreement from a set of multiple selectable agreements, where each of the selectable agreements is associated with a respective sponsor, a respective battery usage condition, or a combination thereof.

Figure 9:
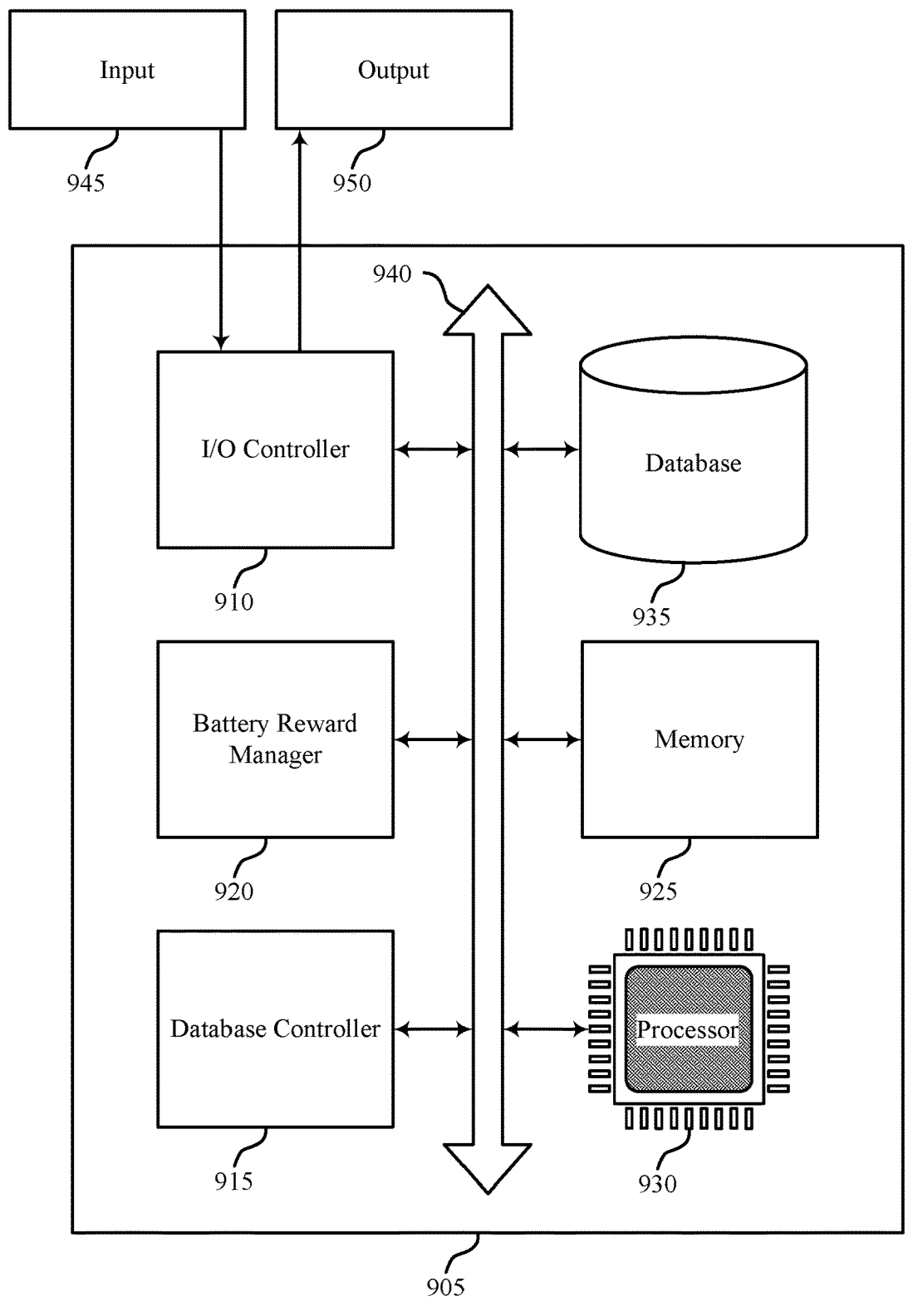
FIG. 9 shows a diagram of a system including a device that supports a battery management reward network and system in accordance with one or more aspects of the present disclosure.

FIG. 9 shows a diagram of a system 900 including a device 905 that supports a battery management reward network and system in accordance with one or more aspects of the present disclosure. The device 905 may be an example of or include the components of a device 705 as described herein. The device 905 may include components for bi-directional data communications including components for transmitting and receiving communications, such as a battery reward manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a basic I/O system (BIOS) which may control basic hardware or software operation such as the interaction with peripheral components or devices.

The processor 930 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting a battery management reward network and system).

The battery reward manager 920 may support battery management in accordance with examples disclosed herein. For example, the battery reward manager 920 may be configured as or otherwise support a means for receiving, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The battery reward manager 920 may be configured as or otherwise support a means for receiving battery usage information associated with the battery identifier of the rechargeable battery. The battery reward manager 920 may be configured as or otherwise support a means for determining, based on execution of the smart contract, that the battery usage information satisfies the one or more battery usage conditions indicated by the agreement. The battery reward manager 920 may be configured as or otherwise support a means for causing execution of a token release action responsive to determining that the battery usage information satisfies the one or more battery usage conditions indicated by the agreement, where the token release action causes transmission of the token release amount of tokens managed by the smart contract to one or more participants set forth in the agreement.

By including or configuring the battery reward manager 920 in accordance with examples as described herein, the device 905 may promote more efficient energy utilization, greater environmental collaboration, and reduced greenhouse gas emission, among other benefits. For example, the techniques described herein may reward users and participants for environmentally friendly behaviors (charging batteries at designated locations, sharing energy with other users, purchasing environmentally conscious products) by transforming these behaviors and actions into tangible impacts (planting trees, protecting wildlife, restoring natural habitats) that reduce greenhouse gas emissions and promote sustainability.

Figure 10:
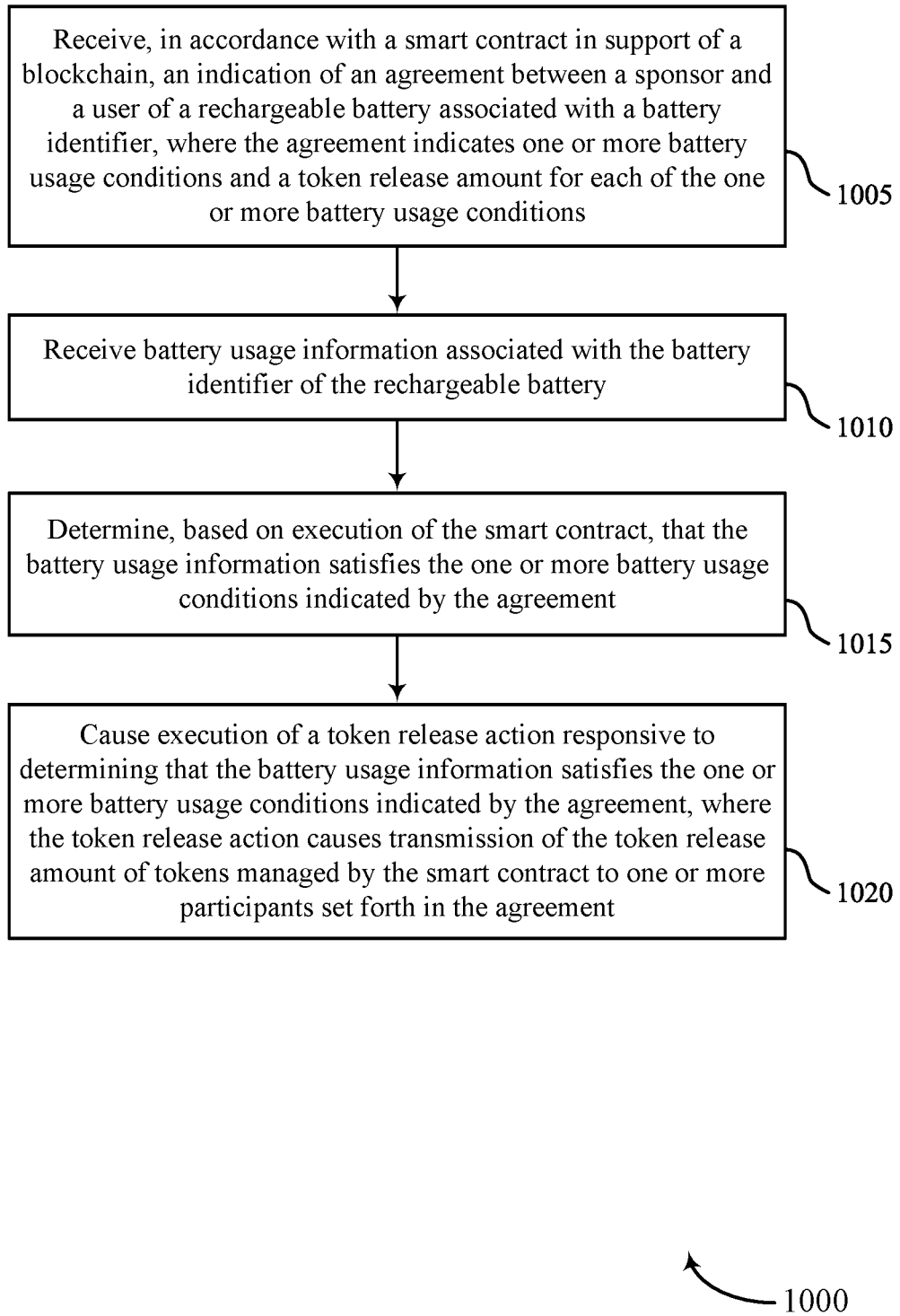
FIGS. 10 through 13 show flowcharts illustrating methods that support a battery management reward network and system in accordance with one or more aspects of the present disclosure.

FIG. 10 shows a flowchart illustrating a method 1000 that supports a battery management reward network and system in accordance with one or more aspects of the present disclosure. The operations of the method 1000 may be implemented by a reward management system or components thereof. For example, the operations of the method 1000 may be performed by a reward management system 610, as described with reference to FIG. 6. In some examples, a reward management system may execute a set of instructions to control the functional elements of the reward management system to perform the described functions. Additionally, or alternatively, the reward management system may perform aspects of the described functions using special-purpose hardware.

At 1005, the reward management system may receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The operations of 1005 may be performed in accordance with examples disclosed herein. In some examples, aspects of the operations of 1005 may be performed by a smart contract component 825, as described with reference to FIG. 8.

At 1010, the reward management system may receive battery usage information associated with the battery identifier of the rechargeable battery. The operations of 1010 may be performed in accordance with examples disclosed herein. In some examples, aspects of the operations of 1010 may be performed by a battery usage component 830, as described with reference to FIG. 8.

At 1015, the reward management system may determine, based on execution of the smart contract, that the battery usage information satisfies the one or more battery usage conditions indicated by the agreement. The operations of 1015 may be performed in accordance with examples disclosed herein. In some examples, aspects of the operations of 1015 may be performed by a usage condition component 835, as described with reference to FIG. 8.

At 1020, the reward management system may cause execution of a token release action responsive to determining that the battery usage information satisfies the one or more battery usage conditions indicated by the agreement, where the token release action causes transmission of the token release amount of tokens managed by the smart contract to one or more participants set forth in the agreement. The operations of 1020 may be performed in accordance with examples disclosed herein. In some examples, aspects of the operations of 1020 may be performed by a token release component 840, as described with reference to FIG. 8.

Figure 11:
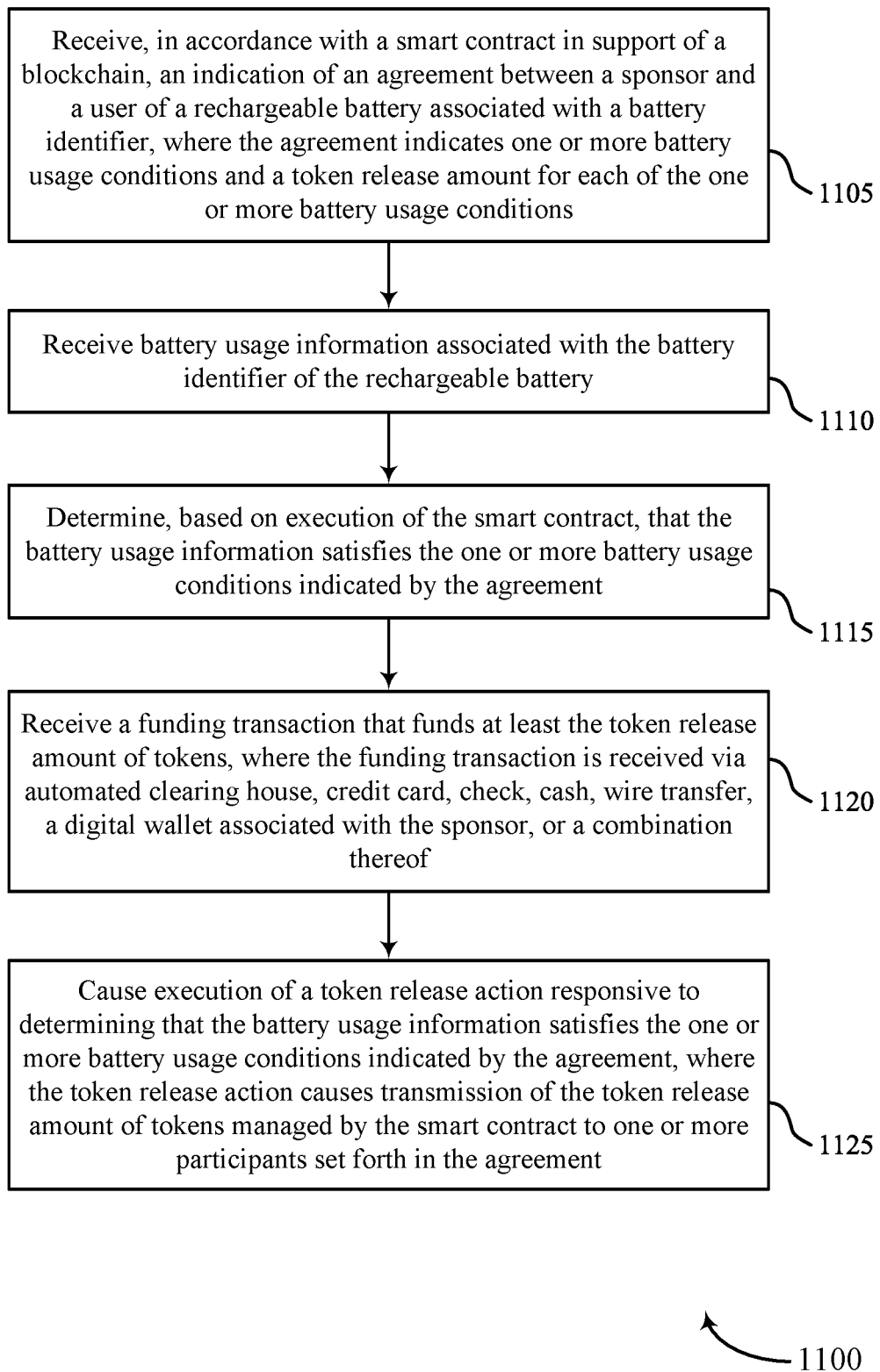

FIG. 11 shows a flowchart illustrating a method 1100 that supports a battery management reward network and system in accordance with one or more aspects of the present disclosure. The operations of the method 1100 may be implemented by a reward management system or components thereof. For example, the operations of the method 1100 may be performed by a reward management system 610, as described with reference to FIG. 6. In some examples, a reward management system may execute a set of instructions to control the functional elements of the reward management system to perform the described functions. Additionally, or alternatively, the reward management system may perform aspects of the described functions using special-purpose hardware.

At 1105, the reward management system may receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The operations of 1105 may be performed in accordance with examples disclosed herein. In some examples, aspects of the operations of 1105 may be performed by a smart contract component 825, as described with reference to FIG. 8.

At 1110, the reward management system may receive battery usage information associated with the battery identifier of the rechargeable battery. The operations of 1110 may be performed in accordance with examples disclosed herein. In some examples, aspects of the operations of 1110 may be performed by a battery usage component 830, as described with reference to FIG. 8.

At 1115, the reward management system may determine, based on execution of the smart contract, that the battery usage information satisfies the one or more battery usage conditions indicated by the agreement. The operations of 1115 may be performed in accordance with examples disclosed herein. In some examples, aspects of the operations of 1115 may be performed by a usage condition component 835, as described with reference to FIG. 8.

At 1120, the reward management system may receive a funding transaction that funds at least the token release amount of tokens, where the funding transaction is received via automated clearing house, credit card, check, cash, wire transfer, a digital wallet associated with the sponsor, or a combination thereof. The operations of 1120 may be performed in accordance with examples disclosed herein. In some examples, aspects of the operations of 1120 may be performed by a funding transaction component 850, as described with reference to FIG. 8.

At 1125, the reward management system may cause execution of a token release action responsive to determining that the battery usage information satisfies the one or more battery usage conditions indicated by the agreement, where the token release action causes transmission of the token release amount of tokens managed by the smart contract to one or more participants set forth in the agreement. The operations of 1125 may be performed in accordance with examples disclosed herein. In some examples, aspects of the operations of 1125 may be performed by a token release component 840, as described with reference to FIG. 8.

Figure 12:
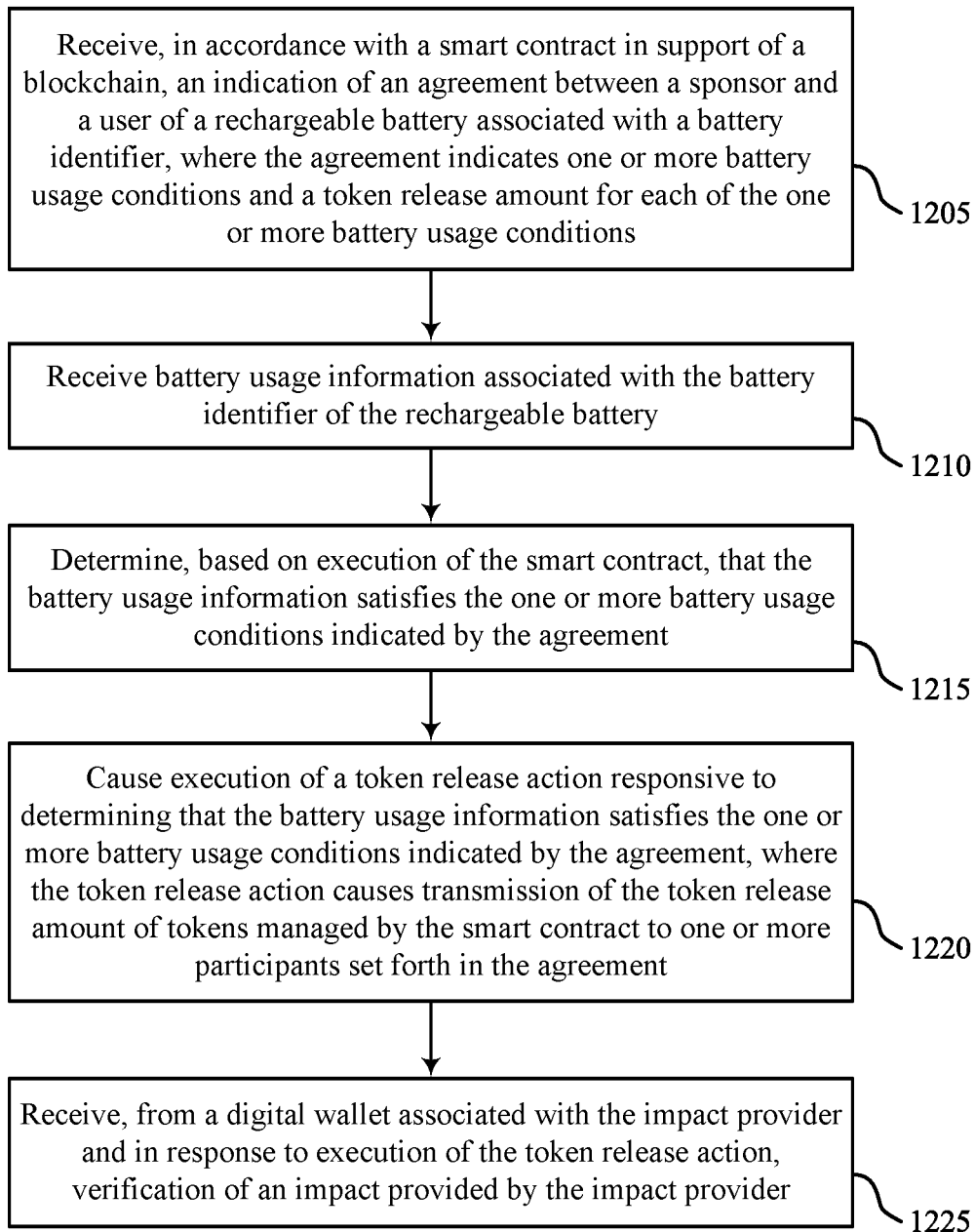

FIG. 12 shows a flowchart illustrating a method 1200 that supports a battery management reward network and system in accordance with one or more aspects of the present disclosure. The operations of the method 1200 may be implemented by a reward management system or components thereof. For example, the operations of the method 1200 may be performed by a reward management system 610, as described with reference to FIG. 6. In some examples, a reward management system may execute a set of instructions to control the functional elements of the reward management system to perform the described functions. Additionally, or alternatively, the reward management system may perform aspects of the described functions using special-purpose hardware.

At 1205, the reward management system may receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The operations of 1205 may be performed in accordance with examples disclosed herein. In some examples, aspects of the operations of 1205 may be performed by a smart contract component 825, as described with reference to FIG. 8.

At 1210, the reward management system may receive battery usage information associated with the battery identifier of the rechargeable battery. The operations of 1210 may be performed in accordance with examples disclosed herein. In some examples, aspects of the operations of 1210 may be performed by a battery usage component 830, as described with reference to FIG. 8.

At 1215, the reward management system may determine, based on execution of the smart contract, that the battery usage information satisfies the one or more battery usage conditions indicated by the agreement. The operations of 1215 may be performed in accordance with examples disclosed herein. In some examples, aspects of the operations of 1215 may be performed by a usage condition component 835, as described with reference to FIG. 8.

At 1220, the reward management system may cause execution of a token release action responsive to determining that the battery usage information satisfies the one or more battery usage conditions indicated by the agreement, where the token release action causes transmission of the token release amount of tokens managed by the smart contract to one or more participants set forth in the agreement. The operations of 1220 may be performed in accordance with examples disclosed herein. In some examples, aspects of the operations of 1220 may be performed by a token release component 840, as described with reference to FIG. 8.

At 1225, the reward management system may receive, from a digital wallet associated with the impact provider and in response to execution of the token release action, verification of an impact provided by the impact provider. The operations of 1225 may be performed in accordance with examples disclosed herein. In some examples, aspects of the operations of 1225 may be performed by an impact verification component 855, as described with reference to FIG. 8.

Figure 13:
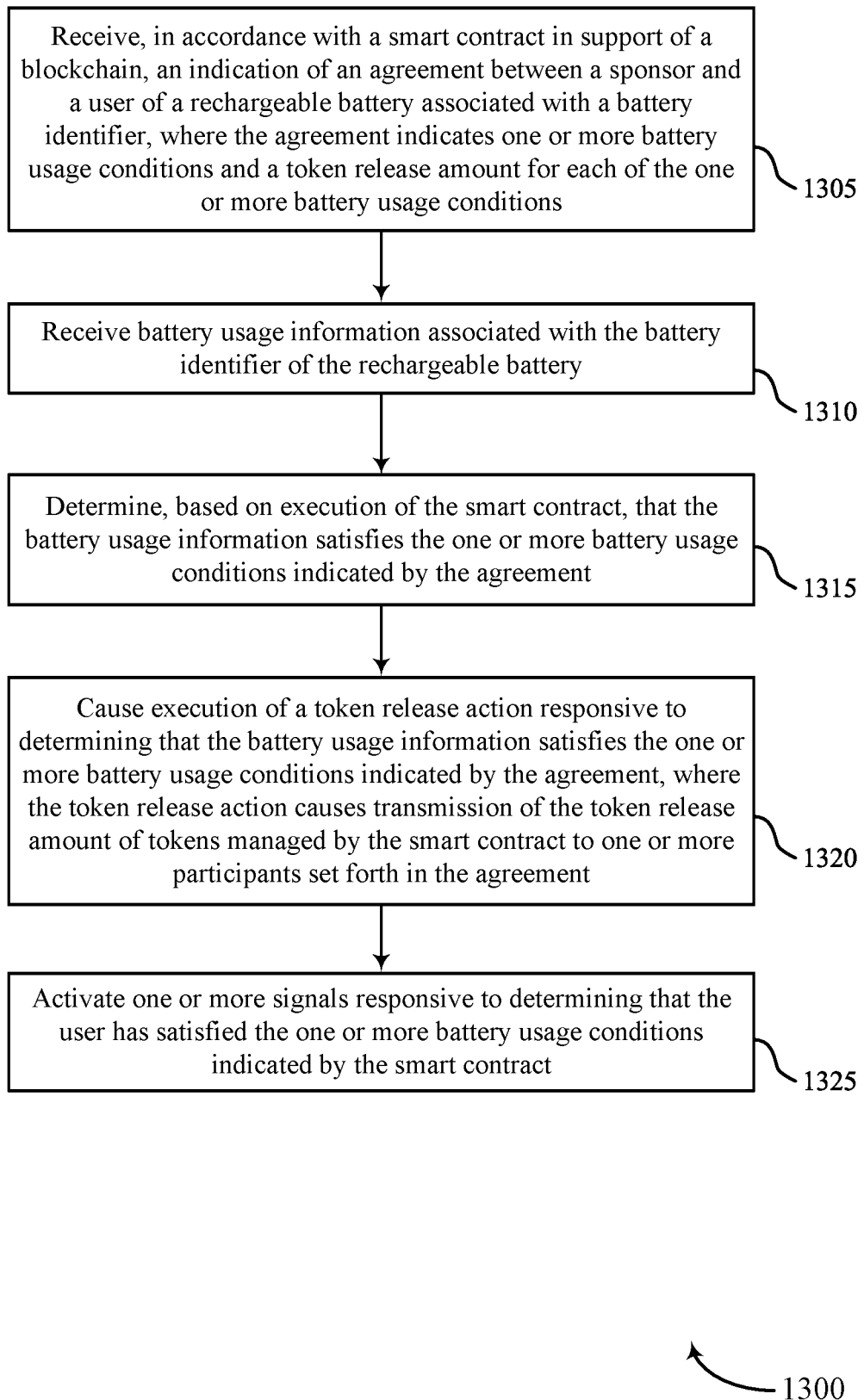

FIG. 13 shows a flowchart illustrating a method 1300 that supports a battery management reward network and system in accordance with one or more aspects of the present disclosure. The operations of the method 1300 may be implemented by a reward management system or components thereof. For example, the operations of the method 1300 may be performed by a reward management system 610, as described with reference to FIG. 6. In some examples, a reward management system may execute a set of instructions to control the functional elements of the reward management system to perform the described functions. Additionally, or alternatively, the reward management system may perform aspects of the described functions using special-purpose hardware.

At 1305, the reward management system may receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The operations of 1305 may be performed in accordance with examples disclosed herein. In some examples, aspects of the operations of 1305 may be performed by a smart contract component 825, as described with reference to FIG. 8.

At 1310, the reward management system may receive battery usage information associated with the battery identifier of the rechargeable battery. The operations of 1310 may be performed in accordance with examples disclosed herein. In some examples, aspects of the operations of 1310 may be performed by a battery usage component 830, as described with reference to FIG. 8.

At 1315, the reward management system may determine, based on execution of the smart contract, that the battery usage information satisfies the one or more battery usage conditions indicated by the agreement. The operations of 1315 may be performed in accordance with examples disclosed herein. In some examples, aspects of the operations of 1315 may be performed by a usage condition component 835, as described with reference to FIG. 8.

At 1320, the reward management system may cause execution of a token release action responsive to determining that the battery usage information satisfies the one or more battery usage conditions indicated by the agreement, where the token release action causes transmission of the token release amount of tokens managed by the smart contract to one or more participants set forth in the agreement. The operations of 1320 may be performed in accordance with examples disclosed herein. In some examples, aspects of the operations of 1320 may be performed by a token release component 840, as described with reference to FIG. 8.

At 1325, the reward management system may activate one or more signals responsive to determining that the user has satisfied the one or more battery usage conditions indicated by the smart contract. The operations of 1325 may be performed in accordance with examples disclosed herein. In some examples, aspects of the operations of 1325 may be performed by a signal activation component 860, as described with reference to FIG. 8.

A method for supporting battery management is described. The method may include receiving, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The method may further include receiving battery usage information associated with the battery identifier of the rechargeable battery. The method may further include determining, based on execution of the smart contract, that the battery usage information satisfies the one or more battery usage conditions indicated by the agreement. The method may further include causing execution of a token release action responsive to determining that the battery usage information satisfies the one or more battery usage conditions indicated by the agreement, where the token release action causes transmission of the token release amount of tokens managed by the smart contract to one or more participants set forth in the agreement.

An apparatus for supporting battery management is described. The apparatus may include a processor, memory coupled with the processor, and instructions stored in the memory. The instructions may be executable by the processor to cause the apparatus to receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The instructions may be further executable by the processor to cause the apparatus to receive battery usage information associated with the battery identifier of the rechargeable battery. The instructions may be further executable by the processor to cause the apparatus to determine, based on execution of the smart contract, that the battery usage information satisfies the one or more battery usage conditions indicated by the agreement. The instructions may be further executable by the processor to cause the apparatus to cause execution of a token release action responsive to determining that the battery usage information satisfies the one or more battery usage conditions indicated by the agreement, where the token release action causes transmission of the token release amount of tokens managed by the smart contract to one or more participants set forth in the agreement.

Another apparatus for supporting battery management is described. The apparatus may include means for receiving, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The apparatus may further include means for receiving battery usage information associated with the battery identifier of the rechargeable battery. The apparatus may further include means for determining, based on execution of the smart contract, that the battery usage information satisfies the one or more battery usage conditions indicated by the agreement. The apparatus may further include means for causing execution of a token release action responsive to determining that the battery usage information satisfies the one or more battery usage conditions indicated by the agreement, where the token release action causes transmission of the token release amount of tokens managed by the smart contract to one or more participants set forth in the agreement.

A non-transitory computer-readable medium storing code for supporting battery management is described. The code may include instructions executable by a processor to receive, in accordance with a smart contract in support of a blockchain, an indication of an agreement between a sponsor and a user of a rechargeable battery associated with a battery identifier, where the agreement indicates one or more battery usage conditions and a token release amount for each of the one or more battery usage conditions. The instructions may be further executable by the processor to receive battery usage information associated with the battery identifier of the rechargeable battery. The instructions may be further executable by the processor to determine, based on execution of the smart contract, that the battery usage information satisfies the one or more battery usage conditions indicated by the agreement. The instructions may be further executable by the processor to cause execution of a token release action responsive to determining that the battery usage information satisfies the one or more battery usage conditions indicated by the agreement, where the token release action causes transmission of the token release amount of tokens managed by the smart contract to one or more participants set forth in the agreement.

In some examples of the methods, apparatuses, and non-transitory computer-readable media described herein, receiving the battery usage information may include operations, features, means, or instructions for receiving recharge and utilization information associated with the battery identifier of the rechargeable battery, where the recharge and utilization information satisfies a battery recharge condition of the one or more battery usage conditions.

In some examples of the methods, apparatuses, and non-transitory computer-readable media described herein, the battery recharge condition includes a recharge amount, a recharge time period, a recharge location, a battery depletion threshold, or a combination thereof. In some examples of the methods, apparatuses, and non-transitory computer-readable media described herein, the recharge and utilization information indicates a battery recharge time, a battery recharge location, a battery depletion amount, or a combination thereof.

In some examples of the methods, apparatuses, and non-transitory computer-readable media described herein, determining that the user has satisfied the one or more battery usage conditions may include operations, features, means, or instructions for determining that a quantity of miles driven by the user in an electric vehicle satisfies a climate neutrality threshold based on the battery usage information, where the electric vehicle includes the rechargeable battery associated with the battery identifier.

Some examples of the methods, apparatuses, and non-transitory computer-readable media described herein may further include operations, features, means, or instructions for generating, using a transaction log associated with the smart contract and the battery identifier, a battery grade of the rechargeable battery, a resale value of the rechargeable battery, a maintenance status of the rechargeable battery, a battery hygiene grade of the rechargeable battery, a battery hygiene grade of the user, or a combination thereof.

In some examples of the methods, apparatuses, and non-transitory computer-readable media described herein, receiving the battery usage information may include operations, features, means, or instructions for receiving the battery usage information from an oracle system that is configured to verify the battery identifier of the rechargeable battery, information associated with the user of the rechargeable battery, a recharge amount, a recharge location, a battery charge status, battery usage activity, or a combination thereof.

Some examples of the methods, apparatuses, and non-transitory computer-readable media described herein may further include operations, features, means, or instructions for receiving a funding transaction that funds at least the token release amount of tokens, where the funding transaction is received via automated clearing house, credit card, check, cash, wire transfer, a digital wallet associated with the sponsor, or a combination thereof.

In some examples of the methods, apparatuses, and non-transitory computer-readable media described herein, the battery identifier is associated with an electric vehicle that includes the rechargeable battery. In some examples of the methods, apparatuses, and non-transitory computer-readable media described herein, the battery usage information is received from the electric vehicle, a recharging station, or both.

Some examples of the methods, apparatuses, and non-transitory computer-readable media described herein may further include operations, features, means, or instructions for receiving, from a digital wallet associated with the impact provider and in response to execution of the token release action, verification of an impact provided by the impact provider.

In some examples of the methods, apparatuses, and non-transitory computer-readable media described herein, the token release action causes transmission of a second amount of tokens managed by the smart contract to a digital wallet associated with the user of the rechargeable battery.

In some examples of the methods, apparatuses, and non-transitory computer-readable media described herein, the token release action causes transmission of at least a portion of a token associated with one or both of the rechargeable battery or an electric vehicle that includes the rechargeable battery.

In some examples of the methods, apparatuses, and non-transitory computer-readable media described herein, the user, the sponsor, the impact provider, or a combination thereof are associated with one or more DAOs that include one or more consumers, sponsors, businesses, governments, or agencies.

In some examples of the methods, apparatuses, and non-transitory computer-readable media described herein, the one or more battery usage conditions includes environmental trip routing conditions, electricity usage conditions, electricity sharing conditions, disaster recovery conditions, V2G sharing conditions, V2V sharing conditions, grid-load-balancing conditions, geofence usage conditions, or a combination thereof.

Some examples of the methods, apparatuses, and non-transitory computer-readable media described herein may further include operations, features, means, or instructions for activating one or more signals responsive to determining that the user has satisfied the one or more battery usage conditions indicated by the smart contract.

In some examples of the methods, apparatuses, and non-transitory computer-readable media described herein, the one or more signals include visual signals, auditory signals, or olfactory signals that indicate an environmental impact of the user, a contribution level of the user, or both.

In some examples of the methods, apparatuses, and non-transitory computer-readable media described herein, the one or more signals activate one or more IoT infrastructure components, token-restricted memberships, downloads, in-car entertainment experiences, social media interactions, or a combination thereof.

In some examples of the methods, apparatuses, and non-transitory computer-readable media described herein, receiving the indication of the agreement may include operations, features, means, or instructions for receiving, via a user interface of a market of climate action agreements, a selection of the agreement from a set of multiple selectable agreements, where each of the selectable agreements is associated with a respective sponsor, a respective battery usage condition, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different locations (e.g., physical locations, digital twins, metaverses). Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for supporting battery management at a first computing device of a distributed system, comprising:
    receiving, at the first computing device in accordance with a smart contract deployed to a blockchain and executed by the first computing device in in support of the blockchain, an indication of an agreement between a sponsor and a user of a rechargeable battery associated with a battery identifier, wherein the agreement indicates one or more battery usage conditions and a token release amount for each of the one or more battery usage conditions;
    receiving, from a second computing device of the distributed system, battery usage information associated with the battery identifier of the rechargeable battery;
    determining, based at least in part on execution of the smart contract and using at least one processor of the first computing device, that the battery usage information satisfies the one or more battery usage conditions indicated by the agreement; and
    causing execution of a token release action via the blockchain responsive to using the at least one processor of the first computing device to determine that the battery usage information satisfies the one or more battery usage conditions indicated by the agreement, wherein the token release action causes transmission of the token release amount of tokens managed by the smart contract to one or more participants set forth in the agreement.

2. The method of claim 1, wherein receiving the battery usage information comprises:
    receiving recharge and utilization information associated with the battery identifier of the rechargeable battery, wherein the recharge and utilization information satisfies a battery recharge condition of the one or more battery usage conditions.

3. The method of claim 2, wherein:
    the battery recharge condition comprises a recharge amount, a recharge time period, a recharge location, a battery depletion threshold, or a combination thereof; and the recharge and utilization information indicates a battery recharge time, a battery recharge location, a battery depletion amount, or a combination thereof.

4. The method of claim 1, wherein determining that the user has satisfied the one or more battery usage conditions comprises:
determining that a quantity of miles driven by the user in an electric vehicle satisfies a climate neutrality threshold based at least in part on the battery usage information, wherein the electric vehicle includes the rechargeable battery associated with the battery identifier.

5. The method of claim 1, further comprising:
generating, using a transaction log associated with the smart contract and the battery identifier, a battery grade of the rechargeable battery, a resale value of the rechargeable battery, a maintenance status of the rechargeable battery, a battery hygiene grade of the rechargeable battery, a battery hygiene grade of the user, or a combination thereof.

6. The method of claim 1, wherein receiving the battery usage information comprises:
receiving the battery usage information from an oracle system that is configured to verify the battery identifier of the rechargeable battery, information associated with the user of the rechargeable battery, a recharge amount, a recharge location, a battery charge status, battery usage activity, or a combination thereof.

7. The method of claim 1, further comprising:
receiving a funding transaction that funds at least the token release amount of tokens, wherein the funding transaction is received via automated clearing house, credit card, check, cash, wire transfer, a digital wallet associated with the sponsor, or a combination thereof.

8. The method of claim 1, wherein:
the battery identifier is associated with an electric vehicle that includes the rechargeable battery; and
the battery usage information is received from the electric vehicle, a recharging station, or both.

9. The method of claim 1, further comprising:
receiving, from a digital wallet associated with an impact provider and in response to execution of the token release action, verification of an impact provided by the impact provider.

10. The method of claim 1, wherein the token release action causes transmission of a second amount of tokens managed by the smart contract to a digital wallet associated with the user of the rechargeable battery.

11. The method of claim 1, wherein the token release action causes transmission of at least a portion of a token associated with one or both of the rechargeable battery or an electric vehicle that includes the rechargeable battery.

12. The method of claim 1, wherein the user, the sponsor, the one or more participants, or a combination thereof are associated with one or more digital autonomous organizations that comprise one or more consumers, sponsors, businesses, governments, or agencies.

13. The method of claim 1, wherein the one or more battery usage conditions comprises environmental trip routing conditions, electricity usage conditions, electricity sharing conditions, disaster recovery conditions, vehicle-to-grid sharing conditions, vehicle-to-vehicle sharing conditions, grid-load-balancing conditions, geofence usage conditions, or a combination thereof.

14. The method of claim 1, further comprising:
activating one or more signals responsive to determining that the user has satisfied the one or more battery usage conditions indicated by the smart contract.

15. The method of claim 14, wherein the one or more signals comprise visual signals, auditory signals, or olfactory signals that indicate an environmental impact of the user, a contribution level of the user, or both.

16. The method of claim 14, wherein the one or more signals activate one or more Internet of Things (IoT) infrastructure components, token-restricted memberships, downloads, in-car entertainment experiences, social media interactions, or a combination thereof.

17. The method of claim 1, wherein receiving the indication of the agreement comprises:
receiving, via a user interface of a market of climate action agreements, a selection of the agreement of a plurality of selectable agreements, wherein each agreement of the plurality of selectable agreements is associated with a respective sponsor, a respective battery usage condition, or a combination thereof.

18. An apparatus for supporting battery management at a first computing device of a distributed system, comprising:
a processor;
memory coupled with the processor; and
instructions stored in the memory and executable by the processor to cause the apparatus to:
receive, at the first computing device in accordance with a smart contract deployed to a blockchain and executed by the first computing device in in support of the blockchain, an indication of an agreement between a sponsor and a user of a rechargeable battery associated with a battery identifier, wherein the agreement indicates one or more battery usage conditions and a token release amount for each of the one or more battery usage conditions;
receive, from a second computing device of the distributed system, battery usage information associated with the battery identifier of the rechargeable battery;
determine, based at least in part on execution of the smart contract and using at least one processor of the first computing device, that the battery usage information satisfies the one or more battery usage conditions indicated by the agreement; and
cause execution of a token release action via the blockchain responsive to using the at least one processor of the first computing device to determine that the battery usage information satisfies the one or more battery usage conditions indicated by the agreement, wherein the token release action causes transmission of the token release amount of tokens managed by the smart contract to one or more participants set forth in the agreement.

19. The apparatus of claim 18, wherein the instructions to receive the battery usage information are executable by the processor to cause the apparatus to:
receive recharge and utilization information associated with the battery identifier of the rechargeable battery, wherein the recharge and utilization information satisfies a battery recharge condition of the one or more battery usage conditions.

20. A non-transitory computer-readable medium storing code for supporting battery management at a first computing device of a distributed system, the code comprising instructions executable by a processor to:
receive, at the first computing device in accordance with a smart contract deployed to a blockchain and executed by the first computing device in in support of the blockchain, an indication of an agreement between a sponsor and a user of a rechargeable battery associated with a battery identifier, wherein the agreement indicates one or more battery usage conditions and a token release amount for each of the one or more battery usage conditions;

receive, from a second computing device of the distributed system, battery usage information associated with the battery identifier of the rechargeable battery;

determine, based at least in part on execution of the smart contract and using at least one processor of the first computing device, that the battery usage information satisfies the one or more battery usage conditions indicated by the agreement; and cause execution of a token release action via the blockchain responsive to using the at least one processor of the first computing device to determine that the battery usage information satisfies the one or more battery usage conditions indicated by the agreement, wherein the token release action causes transmission of the token release amount of tokens managed by the smart contract to one or more participants set forth in the agreement.

* * * * *